US009397776B2

(12) United States Patent
Werner et al.

(10) Patent No.: US 9,397,776 B2
(45) Date of Patent: Jul. 19, 2016

(54) CONSTANT-CAPACITY PHYSICAL RESOURCE BLOCKS FOR UPSTREAM TRANSMISSIONS OVER COAX

(71) Applicant: QUALCOMM Incorporated, San Diego, CA (US)

(72) Inventors: Marc W. Werner, Heroldsberg (DE); Andrea Garavaglia, Nuremberg (DE); Nicola Varanese, Nuremberg (DE); Patrick Stupar, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 13/919,765

(22) Filed: Jun. 17, 2013

(65) Prior Publication Data
US 2015/0304065 A1    Oct. 22, 2015

Related U.S. Application Data

(60) Provisional application No. 61/778,229, filed on Mar. 12, 2013, provisional application No. 61/770,236, filed on Feb. 27, 2013.

(51) Int. Cl.
| H04B 10/27 | (2013.01) |
| H04L 27/34 | (2006.01) |
| H04J 14/02 | (2006.01) |
| H04L 1/00 | (2006.01) |
| H04L 5/00 | (2006.01) |
| H04Q 11/00 | (2006.01) |
| H04L 27/00 | (2006.01) |

(52) U.S. Cl.
CPC ............ *H04J 14/0238* (2013.01); *H04B 10/27* (2013.01); *H04L 1/0003* (2013.01); *H04L 1/0009* (2013.01); *H04L 1/0015* (2013.01); *H04L 5/006* (2013.01); *H04L 5/0039* (2013.01); *H04L 5/0046* (2013.01); *H04L 27/0008* (2013.01); *H04Q 11/0071* (2013.01); *H04L 27/34* (2013.01); *H04Q 2011/0064* (2013.01)

(58) Field of Classification Search
USPC ......................................... 398/58
See application file for complete search history.

(56) References Cited

U.S. PATENT DOCUMENTS

| 7,978,975 B2 | 7/2011 | Qian et al. | |
| 8,000,604 B2 | 8/2011 | Qian et al. | |
| 2006/0251180 A1* | 11/2006 | Baum | H04L 1/0003 375/260 |
| 2007/0265016 A1* | 11/2007 | Kahtava | H04L 1/0025 455/452.2 |

(Continued)

OTHER PUBLICATIONS

Boyd., et al., "EPOC Upstream Multiple Modulation Profiles", Mar. 18, 2013, pp. 1-12, XP002723189.

(Continued)

*Primary Examiner* — David Payne
*Assistant Examiner* — Omar S Ismail
(74) *Attorney, Agent, or Firm* — Paradice and Li LLP

(57) ABSTRACT

A coax line terminal (CLT) transmits allocations of upstream bandwidth to a plurality of coax network units (CNUs). In response to the allocations, the CLT receives frames with data in a plurality of physical resource blocks that each correspond to a distinct set of subcarriers. The plurality of physical resource blocks includes a first group of physical resource blocks that all have a first constant allowed capacity. Sizes and modulation orders of respective physical resource blocks in the first group vary as defined by a first modulation profile. The data in the first group are received from one or more CNUs that are assigned the first modulation profile.

24 Claims, 18 Drawing Sheets

(56) References Cited

U.S. PATENT DOCUMENTS

| | | | |
|---|---|---|---|
| 2008/0267630 A1* | 10/2008 | Qian | H04J 14/0226 |
| | | | 398/89 |
| 2011/0058813 A1 | 3/2011 | Boyd et al. | |
| 2011/0299490 A1* | 12/2011 | Nordstrom | H04L 1/1861 |
| | | | 370/329 |
| 2012/0182950 A1* | 7/2012 | Chung | H04L 5/0053 |
| | | | 370/329 |
| 2012/0257892 A1 | 10/2012 | Boyd et al. | |
| 2013/0004155 A1 | 1/2013 | Liang et al. | |
| 2013/0322882 A1* | 12/2013 | Fang | H04J 3/1694 |
| | | | 398/67 |

OTHER PUBLICATIONS

Dai E., et al., "EPoC Upstream Modulation Profiles", Jul. 14, 2013, pp. 1-24, XP002723190.

Hal R., et al., "Multiple Modulation Profiles in the Upstream? An examination of the Potential Benefits", Jan. 22, 2013, 13 pages, XP068047322.

International Search Report and Written Opinion—PCT/US2014/012666—ISA/EPO—Apr. 25, 2014.

Boyd, "EPOC pstream Mapping Part 2," IEEE 802.3bn EPoC, pp. 10-pp. 12, Nov. 2012.

Boyd, "EPOC Upstream Mapping," IEEE 802.3bn EPoC, pp. 9-pp. 12, San Antonio, Nov. 2012.

\* cited by examiner

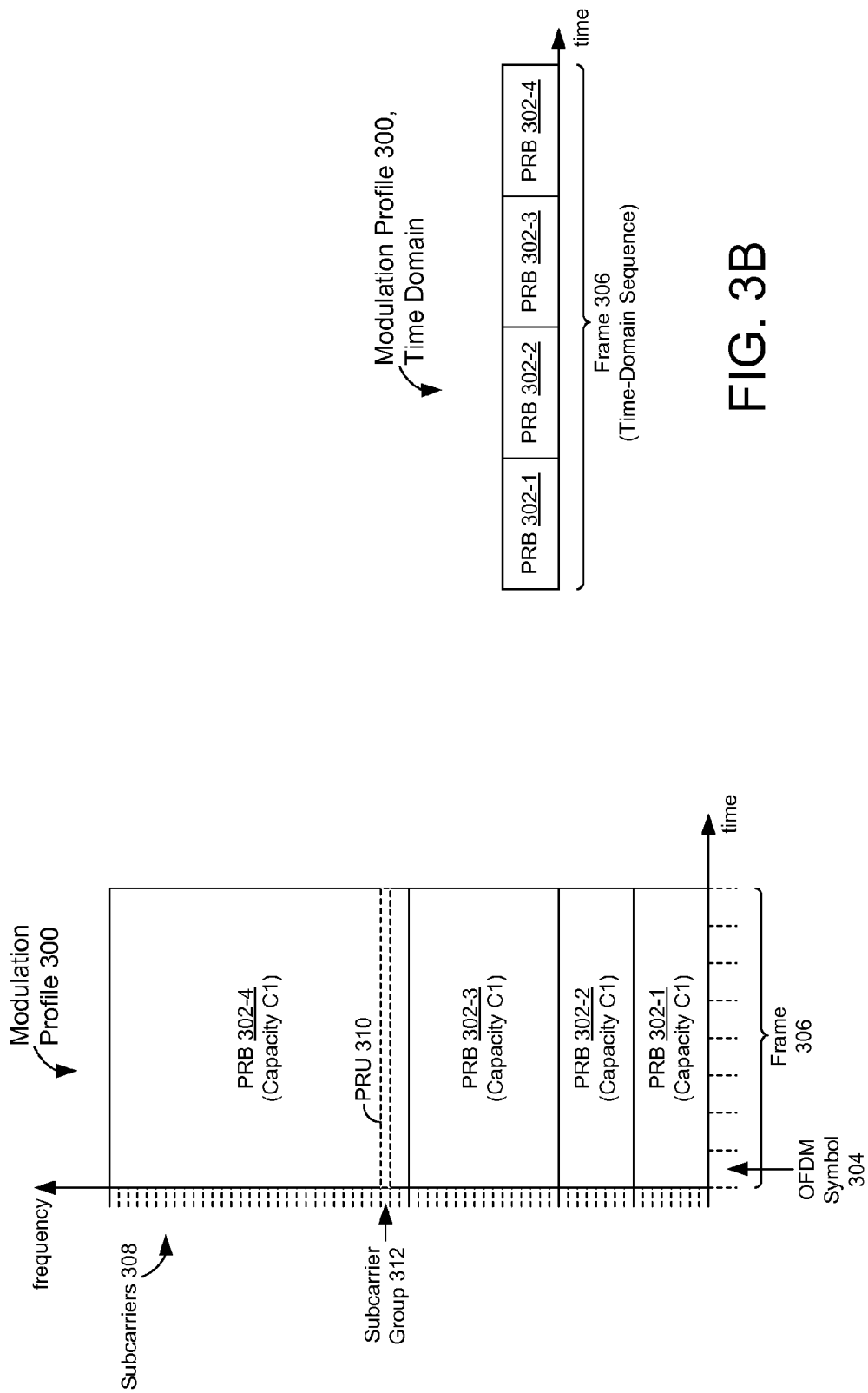

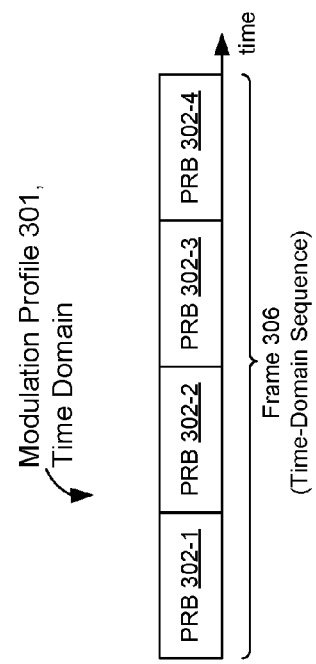
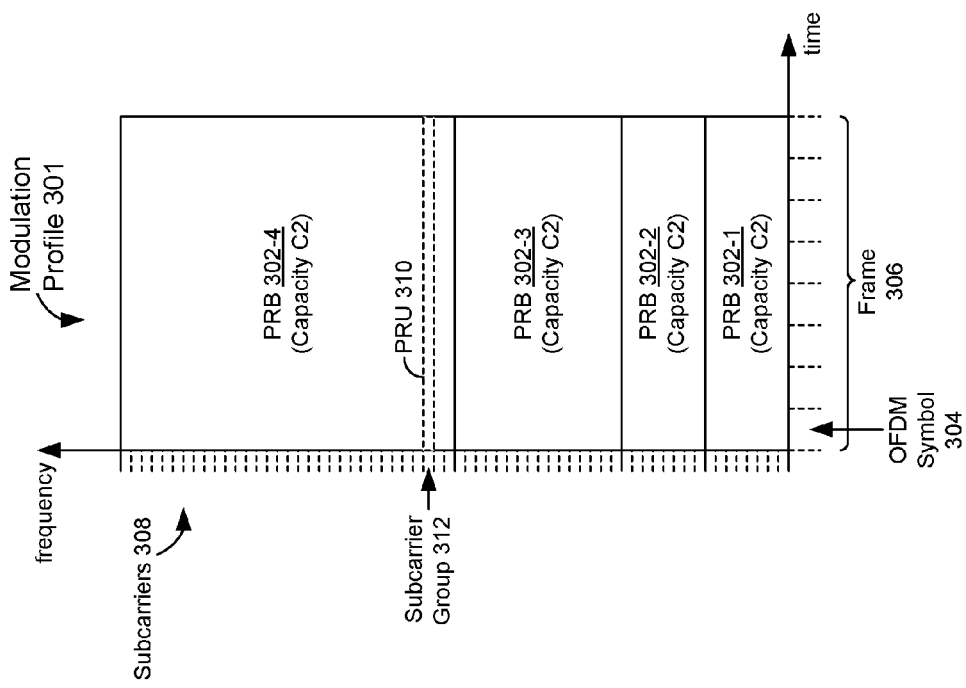

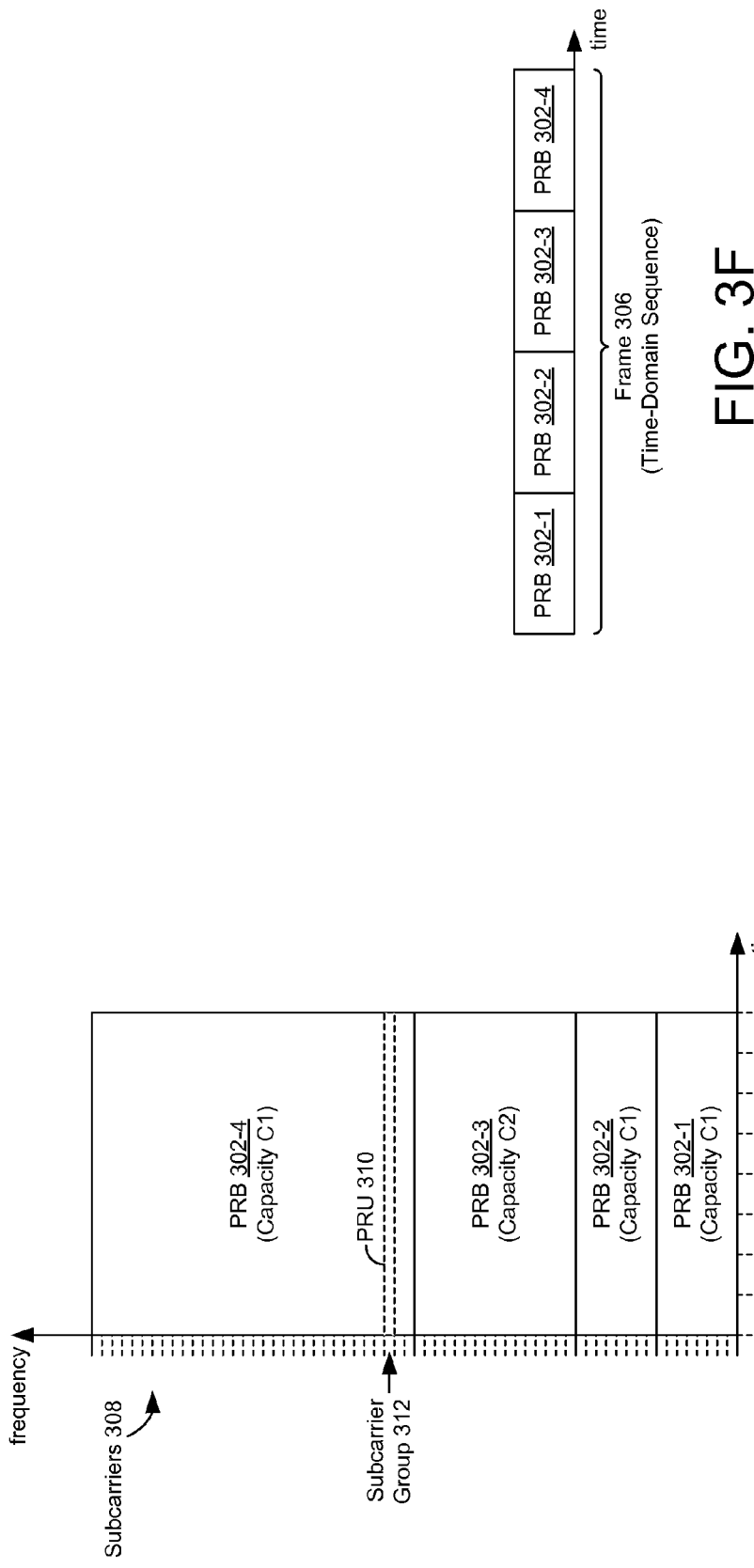

CONSTANT-CAPACITY PHYSICAL RESOURCE BLOCKS FOR UPSTREAM TRANSMISSIONS OVER COAX

RELATED APPLICATION

This application claims priority to U.S. Provisional Patent Applications No. 61/770,236, titled "Constant-Capacity Physical Resource Blocks for Upstream Transmissions over Coax," filed Feb. 27, 2013, and No. 61/778,229, titled "Constant-Capacity Physical Resource Blocks for Upstream Transmissions over Coax," filed Mar. 12, 2013, both of which are hereby incorporated by reference in their entirety.

TECHNICAL FIELD

The present embodiments relate generally to communication systems, and specifically to upstream transmissions in coaxial (coax) networks.

BACKGROUND OF RELATED ART

The Ethernet Passive Optical Networks (EPON) protocol may be extended over coaxial (coax) links in a cable plant. The EPON protocol as implemented over coax links is called EPON Protocol over Coax (EPoC). Implementing an EPoC network or similar network over a cable plant presents significant challenges. For example, channel conditions for coax links in a cable plant may exhibit both frequency variability and variability per coax network unit (CNU). Per-CNU variability may be partially mitigated using power control. Frequency variability may be partially mitigated using equalization or pre-equalization. These mitigation techniques may not be sufficient, however, to adequately compensate for channel variability.

BRIEF DESCRIPTION OF THE DRAWINGS

The present embodiments are illustrated by way of example and are not intended to be limited by the figures of the accompanying drawings.

FIGS. 3A, 3C, 3E, and 3H show modulation profiles with multiple physical resource blocks in accordance with some embodiments.

FIGS. 3B, 3D, 3F, and 3I show the result of time-domain transformation of the physical resource blocks of FIGS. 3A, 3C, 3E, and 3H in accordance with some embodiments.

Like reference numerals refer to corresponding parts throughout the drawings and specification.

DETAILED DESCRIPTION

Figure 1A:
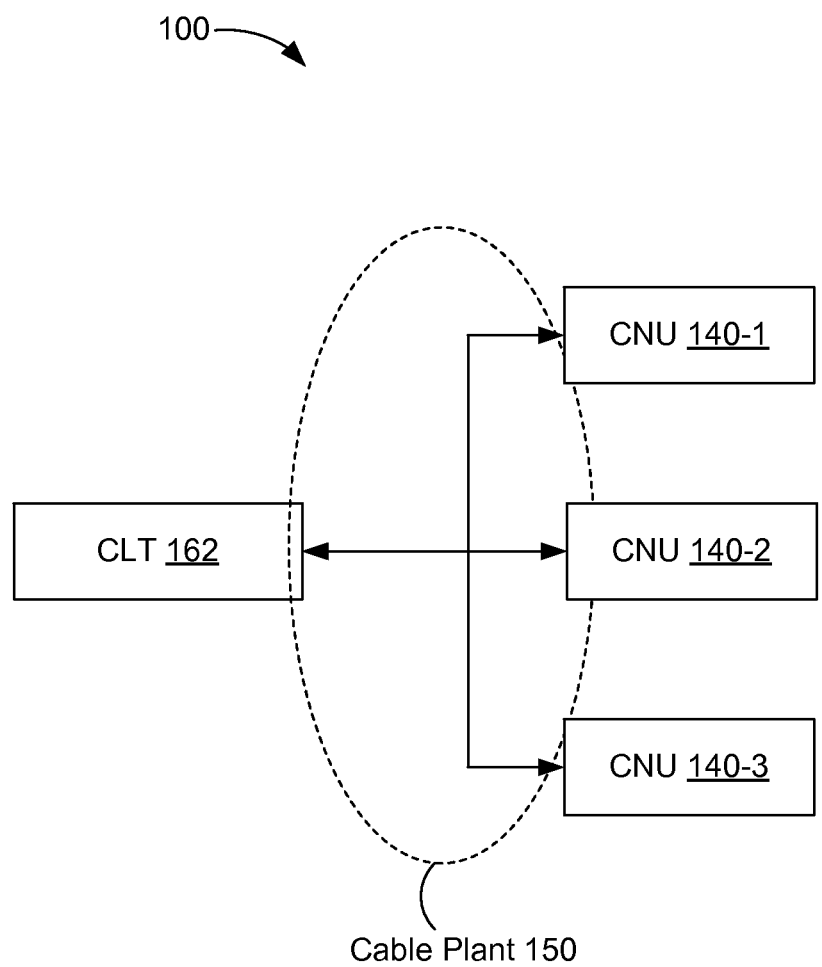
FIG. 1A is a block diagram of a coaxial network in accordance with some embodiments.

Embodiments are disclosed that allow for efficient allocation and use of coax resources in a cable plant.

In some embodiments, a method of operating a coax line terminal (CLT) includes transmitting allocations of upstream bandwidth to a plurality of coax network units (CNUs). In response to the allocations, frames are received with data in a plurality of physical resource blocks that each correspond to a distinct set of subcarriers. The plurality of physical resource blocks comprises a first group of physical resource blocks that all have a first constant allowed capacity. The data in the first group are received from one or more CNUs assigned a first modulation profile. Sizes and modulation orders of respective physical resource blocks in the first group vary as defined by the first modulation profile.

In some embodiments, a method of operating a CNU includes receiving an allocation of upstream bandwidth from a CLT. In response to the allocation, a signal is generated corresponding to at least a portion of a frame. The signal includes data in one or more physical resource blocks of a plurality of physical resource blocks. Each physical resource block of the plurality corresponds to a distinct set of subcarriers, all physical resource blocks of the plurality have a constant allowed capacity, and sizes and modulation orders of respective physical resource blocks of the plurality vary. The signal is transmitted upstream to the CLT.

In some embodiments, a CLT includes a scheduler to allocate upstream bandwidth for a plurality of CNUs. The CLT also includes a physical-layer device (PHY) to transmit allocations of upstream bandwidth, as determined by the scheduler, to the plurality of CNUs and to receive frames with data in a plurality of physical resource blocks. Each of the physical resource blocks corresponds to a distinct set of subcarriers. The plurality of physical resource blocks includes a first group of physical resource blocks that all have a first constant allowed capacity. Sizes and modulation orders of respective physical resource blocks in the first group vary as defined by a first modulation profile.

In some embodiments, a CNU includes a media access controller (MAC) to generate a time-domain sequence in accordance with an allocation of upstream bandwidth from a CLT. The CNU also includes a PHY to map respective portions of the time-domain sequence to respective physical resource blocks of a plurality of physical resource blocks. Each physical resource block of the plurality corresponds to a distinct set of subcarriers, all physical resource blocks of the plurality have a constant allowed capacity, and sizes and modulation orders of respective physical resource blocks of the plurality vary.

In some embodiments, a non-transitory computer-readable storage medium stores one or more programs configured to be executed by one or more processors. The one or more programs include instructions to assign respective modulation-and-coding schemes (MCSs) to respective subcarriers based on signal-to-noise ratio (SNR) statistics for the respective subcarriers. Each MCS specifies a modulation order and code rate. The one or more programs also include instructions to divide the subcarriers into a plurality of physical resource blocks that all have a first constant allowed capacity. Sizes and modulation orders of respective physical resource blocks in the plurality of physical resource blocks vary.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1A is a block diagram of a coax network 100 (e.g., an EPoC network) in accordance with some embodiments. The network 100 includes a coax line terminal (CLT) 162 (also referred to as a coax link terminal) coupled to a plurality of coax network units (CNUs) 140-1, 140-2, and 140-3 via coax links. A respective coax link may be a passive coax cable, or may also include one or more amplifiers and/or equalizers, and may run through one or more splitters and/or taps. The coax links compose a cable plant 150. In some embodiments, the CLT 162 is located at the headend of the cable plant 150 and the CNUs 140 are located at the premises of respective users. Alternatively, the CLT 162 is located within the cable plant 150.

The CLT 162 transmits downstream signals to the CNUs 140-1, 140-2, and 140-3 and receives upstream signals from the CNUs 140-1, 140-2, and 140-3. In some embodiments, each CNU 140 receives every packet transmitted by the CLT 162 and discards packets that are not addressed to it. The CNUs 140-1, 140-2, and 140-3 transmit upstream signals using coax resources specified by the CLT 162. For example, the CLT 162 transmits control messages (e.g., GATE messages) to the CNUs 140-1, 140-2, and 140-3 specifying resources that respective CNUs 140 may use to transmit upstream signals. In some embodiments, the downstream and upstream signals are transmitted using orthogonal frequency-division multiple access (OFDMA). For example, the downstream and upstream signals are orthogonal frequency-division multiplexing (OFDM) signals.

Figure 1B:
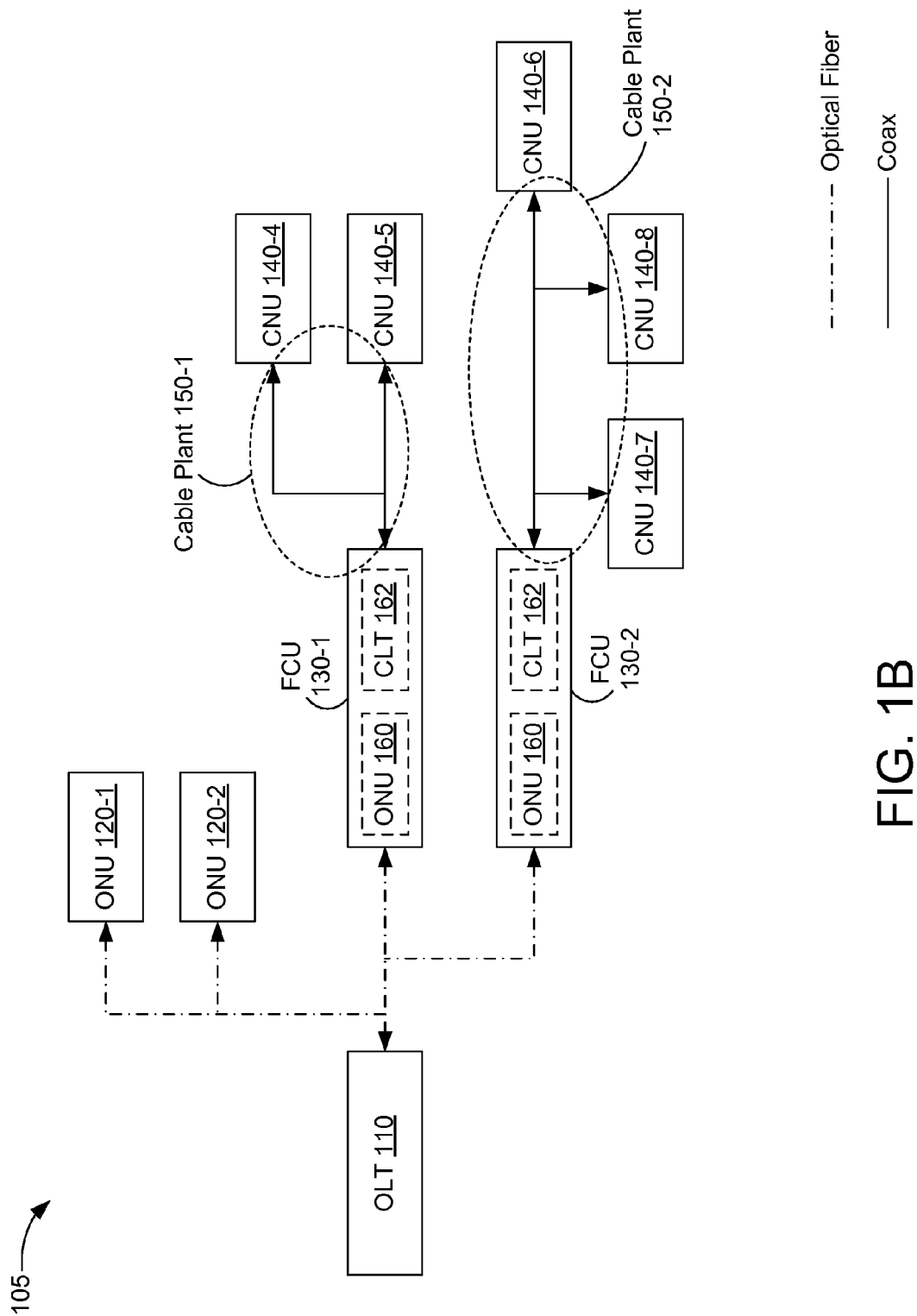
FIG. 1B is a block diagram of a network that includes both optical links and coax links in accordance with some embodiments.

In some embodiments, the CLT 162 is part of a fiber-coax unit (FCU) 130 that is also coupled to an optical line terminal (OLT) 110, as shown in FIG. 1B. FIG. 1B is a block diagram of a network 105 that includes both optical links and coax links in accordance with some embodiments. In the network 105, the OLT 110 (also referred to as an optical link terminal) is coupled to a plurality of optical network units (ONUs) 120-1 and 120-2 via respective optical fiber links. The OLT 110 also is coupled to a plurality of fiber-coax units (FCUs) 130-1 and 130-2 via respective optical fiber links. FCUs are also referred to as optical-coax units (OCUs).

In some embodiments, each FCU 130-1 and 130-2 includes an ONU 160 coupled with a CLT 162. The ONU 160 receives downstream packet transmissions from the OLT 110 and provides them to the CLT 162, which forwards the packets to the CNUs 140 (e.g., CNUs 140-4 and 140-5, or CNUs 140-6 through 140-8) on its cable plant 150 (e.g., cable plant 150-1 or 150-2). In some embodiments, the CLT 162 filters out packets that are not addressed to CNUs 140 on its cable plant 150 and forwards the remaining packets to the CNUs 140 on its cable plant 150. The CLT 162 also receives upstream packet transmissions from CNUs 140 on its cable plant 150 and provides these to the ONU 160, which transmits them to the OLT 110. The ONUs 160 thus receive optical signals from and transmit optical signals to the OLT 110, and the CLTs 162 receive electrical signals from and transmit electrical signals to CNUs 140.

In the example of FIG. 1B, the first FCU 130-1 communicates with CNUs 140-4 and 140-5 (e.g., using OFDMA), and the second FCU 130-2 communicates with CNUs 140-6, 140-7, and 140-8 (e.g., using OFDMA). The coax links coupling the first FCU 130-1 with CNUs 140-4 and 140-5 compose a first cable plant 150-1. The coax links coupling the second FCU 130-2 with CNUs 140-6 through 140-8 compose a second cable plant 150-2. A respective coax link may be a passive coax cable, or alternately may include one or more amplifiers and/or equalizers, and may run through one or more splitters and/or taps. In some embodiments, the OLT 110, ONUs 120-1 and 120-2, and optical portions of the FCUs 130-1 and 130-2 are implemented in accordance with the Ethernet Passive Optical Network (EPON) protocol.

In some embodiments, the OLT 110 is located at a network operator's headend, the ONUs 120 and CNUs 140 are located at the premises of respective users, and the FCUs 130 are located at the headends of their respective cable plants 150 or within their respective cable plants 150.

Figure 2:
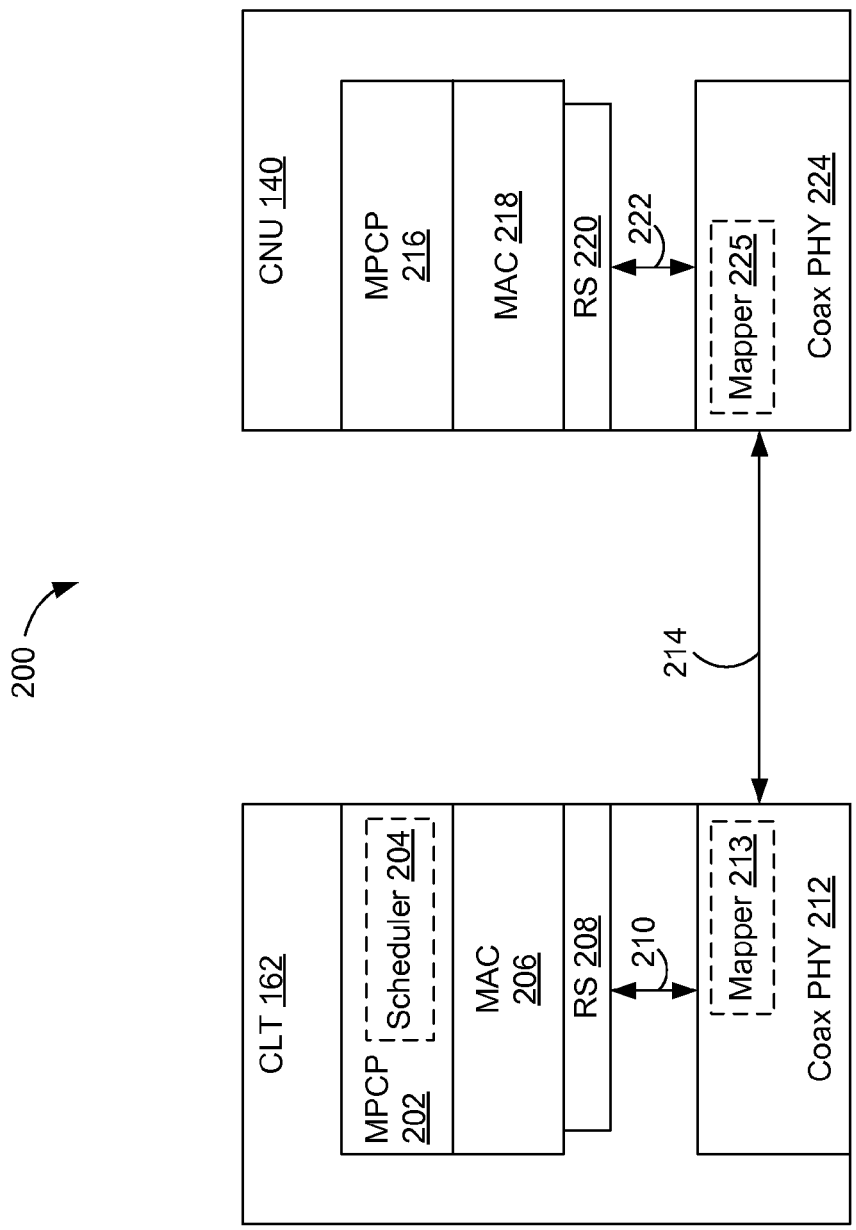
FIG. 2 is a block diagram of a system in which a coax line terminal is coupled to a coax network unit in accordance with some embodiments.

FIG. 2 is a block diagram of a system 200 in which a CLT 162 is coupled to a CNU 140 (e.g., one of the CNUs 140-1 through 140-8, FIGS. 1A-1B) by a coax link 214 (e.g., in a cable plant 150, such as the cable plant 150-1 or 150-2, FIGS. 1A-1B) in accordance with some embodiments. The CLT 162 and CNU 140 communicate via the coax link 214. The coax link 214 couples a coax physical layer device (PHY) 212 in the CLT 162 to a coax PHY 224 in the CNU 140.

The coax PHY 212 in the CLT 162 is coupled to a media access controller (MAC) 206 (e.g., a full-duplex MAC) by a media-independent interface 210 (e.g., an XGMII) and a reconciliation sublayer (RS) 208. In some embodiments, the media-independent interface 210 continuously conveys signals from the MAC 206 to the PHY 212 (e.g., at a fixed rate) and also continuously conveys signals from the PHY 212 to the MAC 206 (e.g., at the fixed rate). The MAC 206 is coupled to a multi-point control protocol (MPCP) implementation 202, which includes a scheduler 204 that performs downstream and upstream packet scheduling. The scheduler 204 implements dynamic bandwidth allocation (DBA) and is also known as a DBA agent. While the scheduler 204 is shown within the MPCP implementation 202, it may be implemented elsewhere (e.g., in a sublayer above the MPCP implementation 202).

The coax PHY 224 in the CNU 140 is coupled to a MAC 218 (e.g., a full-duplex MAC) by a media-independent interface 222 and an RS 220. The MAC 218 is coupled to an MPCP implementation 216 that communicates with the MPCP implementation 202 to schedule upstream transmissions (e.g., by sending REPORT messages to the MPCP 202 implementation and receiving GATE messages in response).

In some embodiments, the MPCP implementations 202 and 216 are implemented as distinct sub-layers in the respective protocol stacks of the CLT 162 and CNU 140. In other embodiments, the MPCP implementations 202 and 216 are respectively implemented in the same layers or sub-layers as the MACs 206 and 218.

In some embodiments, each of the MACs 206 and 218 operates at a constant data rate. The MACs 206 and 218, and also the scheduler 204, may be unaware of the frequencies (e.g., the subcarriers) available for transmissions over coax links 214 in a cable plant 150. Systems that allow the MACs 206 and 218 and/or scheduler 204 to be unaware of available frequencies (e.g., available subcarriers) allow simplification of the design of the MACs 206 and 218 and/or scheduler 204.

The coax PHYs 212 and 224 include respective mapping modules (mappers) 213 and 225 to map time-domain sequences to coax resources in the time and frequency domains, and vice-versa. For example, the mapping modules 213 and 225 map time-domain sequences received from respective MACs 206 and 218 to time-and-frequency-domain coax resources, to generate signals for transmission. The mapping modules 213 and 225 also map time-and-frequency-domain coax resources for received signals to time-domain sequences, which are provided to respective MACs 206 and 218.

Channel conditions for coax links 214 in a cable plant 150 may vary significantly in multiple ways. The upstream (US) signal-to-noise ratio (SNR) may exhibit significant frequency variability, which may result from frequency roll-off (i.e., roll-off in the curve of channel gain versus frequency) and ingress noise. For example, the channel gain may roll off at high frequencies (e.g., above 1 GHz) and ingress noise that couples into the system from other sources may affect low frequencies (e.g., up to approximately 20 MHz). While noise associated with different CNUs 140 funnels upstream into the CLT 162 in a phenomenon known as noise funneling, significant channel variability may still exist from CNU 140 to CNU 140. This per-CNU variability may result from variation in attenuation levels (e.g., as a result of differences in the lengths of coax links 214) and differences in effective frequency-selective channels (FSCs) (e.g., as a result of micro-reflections in the cable plant 150).

Per-CNU variability may be partially mitigated using power control. Frequency variability may be partially mitigated using equalization or pre-equalization. These mitigation techniques may not be sufficient to adequately compensate for channel variability, however, particularly in view of limitations for the dynamic range of CNUs 140.

Frequency-adaptive modulation profiles may therefore be used to mitigate channel variability (e.g., along with power control, equalization, and/or pre-equalization). A modulation profile is a map of modulation orders and code rates to subcarriers, with each combination of a modulation order and a code rate corresponding to a respective modulation and coding scheme (MCS). The modulation orders used in a modulation profile may be selected from a set of available modulation orders, as ranked from highest order (i.e., the modulation order with the highest number of bits per subcarrier per modulation symbol) to lowest order (i.e., the modulation order with the lowest number of bits per subcarrier per modulation symbol). In one example, the set of available modulation orders includes 4096-QAM, 1024-QAM, 256-QAM, 64-QAM, and 16-QAM, where QAM stands for quadrature amplitude modulation. More generally, the set of available modulation orders includes Order 1, Order 2, . . . , Order N, where N is an integer, Order 1 is the highest modulation order in the set, and order N is the lowest modulation order in the set. A modulation profile thus specifies the modulation orders to be used by different subcarriers, as well as the coding (e.g., including the code rates) to be used by different subcarriers. In some embodiments, a modulation profile may specify square constellations (e.g., QAM modulation orders that are even powers of 2), non-square constellations (e.g., QAM modulation orders that are odd powers of 2), and/or mixed constellations to be used by different subcarriers.

In some embodiments, available subcarriers within a specified time period are divided into different chunks (e.g., different groups of contiguous subcarriers), with each chunk corresponding to a respective physical resource block (PRB). PRBs are defined as chunks of subcarriers in a frame, such as an OFDM frame. An OFDM frame includes an integer number of OFDM symbols. In some embodiments, each PRB includes an integer number of physical resource units (PRUs), which are the smallest available units of time and frequency that may be allocated to a CNU 140. A PRU may include a group of contiguous subcarriers within a frame, such that the PRU spans the frame. In one example, a PRU includes 16 subcarriers within a frame.

A modulation profile may be structured such that all of the PRBs in the modulation profile are allowed the same capacity for carrying data. (The allowed capacity for a PRB may differ from the total capacity for a PRB, for example as described below with regard to Table 2.) For a given modulation profile, each PRB thus has a constant allowed capacity in accordance with some embodiments. This constant allowed capacity may be achieved by varying the size, modulation orders, and/or code rates of the PRBs. Using different modulation orders and/or code rates (and thus different MCSs) for different PRBs accommodates SNR variability across frequency by providing different levels of transmission robustness for different frequencies. In some embodiments, the CLT 162 determines the modulation orders to be used for different PRBs in a modulation profile. This determination may be based on channel SNR measurements (e.g., using pilot symbols), as performed for example during initial configuration (e.g., during registration of respective CNUs 140) or during regular operation (e.g., periodically). Channel SNR measurements may be made as part of a sounding procedure (also known as a probing procedure) in which a CNU 140 transmits known data to a CLT 162. Alternatively, a modulation profile may be pre-defined.

In one example, an OFDM frame includes 8 OFDM symbols. A first chunk of 16 subcarriers in a high-SNR portion of the channel's frequency spectrum uses 4096-QAM (with 12 bits per OFDM symbol per subcarrier), for 16*12*8=1536 bits per frame. A second chunk of 24 sub-carriers in a lower-SNR portion of the channel's frequency spectrum uses 256-QAM (with 8 bits per OFDM symbol per subcarrier), for 24*8*8=1536 bits per frame. The PRBs corresponding to the first and second chunks thus both have a constant capacity (which in this example is both the allowed capacity and the total capacity) of 1536 bits.

FIG. 3A shows a modulation profile 300 for which the available subcarriers 308 in a frame 306 are divided into four PRBs 302-1, 302-2, 302-3, and 302-4 in accordance with some embodiments. In the example of FIG. 3A, the frame 306 includes 8 OFDM symbols 304. In other examples, the frame 306 may include a different number of OFDM symbols 304 (e.g., 16 OFDM symbols, or 32 OFDM symbols). Each of the PRBs 302-1, 302-2, 302-3, and 302-4 includes multiple PRUs 310, each of which corresponds to a group 312 of subcarriers 308. The frame 306 may be an upstream frame transmitted by one or more CNUs 140. For example, the four PRBs 302-1, 302-2, 302-3, and 302-4 may contain data transmitted by a single CNU 140. Alternatively, different PRBs 302-1, 302-2, 302-3, and 302-4 (or combinations thereof) may contain data transmitted by different CNUs 140 on a cable plant 150, in accordance with OFDMA. The modulation orders (and in some embodiments, the coding rates) used in each of the PRBs 302-1, 302-2, 302-3, and 302-4 are chosen such that the PRBs 302-1, 302-2, 302-3, and 302-4 all have a constant allowed capacity C1, despite having different numbers of subcarriers 308.

In some embodiments, the subcarriers 308 within respective PRBs 302-1, 302-2, 302-3, and 302-4 are all assigned the same respective modulation order and/or code rate, with the modulation order and/or code rate varying from PRB to PRB. The modulation orders and/or code rates used for respective PRBs may decrease with increasing frequencies, to allow for more robust communications at higher frequencies. For example, the PRB 302-3 has a lower modulation order than the PRBs 302-1 and 302-2, as indicated by the fact that PRB 302-3 has the same capacity C1 as the PRBs 302-1 and 302-2 despite having more subcarriers 308 than the PRBs 302-1 and 302-2. Similarly, the PRB 302-4 has a lower modulation order than the PRB 302-3. Alternatively, modulation orders are assigned on a subcarrier-by-subcarrier basis (i.e., a per-subcarrier basis), in a process known as bit-loading, or are assigned to subcarrier groupings that are not aligned with the PRBs. In another alternative, the subcarriers 308 within respective PRUs 310 are all assigned the same respective modulation order and/or code rate, which may vary across PRUs 310. Regardless, the modulation orders (and/or code rates) are assigned such that the PRBs 302-1, 302-2, 302-3, and 302-4 all have the constant allowed capacity C1.

FIG. 3B shows the frame 306 of FIG. 3A as transformed into a time-domain sequence in accordance with some embodiments. The MACs 206 and/or 218 process the frame 306 in the time domain. Each of the PRBs 302-1, 302-2, 302-3, and 302-4 has the same duration when transformed into the time domain. In other words, each portion of the time-domain sequence for the frame 306 that corresponds to a respective one of the PRBs 302-1, 302-2, 302-3, and 302-4 has the same duration. This constant duration is proportional to the duration of the frame 306 (e.g., is a specified fraction of an OFDM frame duration). The scheduler 204 (FIG. 2) may be frequency unaware and may allocate bandwidth by allocating times in the time domain to different CNUs, where the allocated times correspond to PRB durations in the time domain (i.e., to the duration of portions of the time-domain sequence corresponding to respective PRBs).

In some embodiments, the time-domain frame 306 of FIG. 3B is generated in the MAC of the transmitting device (e.g., MAC 218, FIG. 2) and provided to the PHY of the transmitting device (e.g., coax PHY 224, FIG. 2). For example, the time-domain frame 306 is part of a bitstream (e.g., a continuous bitstream) provided across a media-independent interface (e.g., media-independent interface 222, FIG. 2) at a fixed rate (e.g., 10 Gbps). The PHY of the transmitting device converts the time-domain frame 306 to the time-and-frequency domain frame 306 of FIG. 3A and transmits the frame 306. The PHY of the receiving device (e.g., coax PHY 212, FIG. 2) receives the time-and-frequency-domain frame 306 of FIG. 3A, converts it to the time-domain frame 306 of FIG. 3B, and provides it to the MAC of the receiving device (e.g., MAC 206, FIG. 2). For example, the PHY of the receiving device provides the time-domain frame 306 to the MAC as part of a bitstream (e.g., a continuous bitstream) provided across a media-independent interface (e.g., media-independent interface 210, FIG. 2) at a fixed rate (e.g., 10 Gbps).

In some embodiments, only a single modulation profile (e.g., the modulation profile 300) is available for the CNUs 140 on a cable plant 150. Alternatively, two or more modulation profiles are available. Different modulation profiles may be assigned to different CNUs on the cable plant. For example, the CLT 162 determines which modulation profile to assign to respective CNUs 140. This determination may be based on channel SNR measurements (e.g., using pilot symbols), as performed for example during initial configuration (e.g., during registration of a respective CNU 140) or during regular operation (e.g., periodically). In some embodiments, this determination is made based on sounding.

The CNU 140 may store multiple modulation profiles (e.g., in a memory 1124, FIG. 11B) and the CLT 162 may assign a profile by providing the CNU 140 with an index into a map of the multiple modulation profiles, thereby implicitly signaling the assigned profile. Alternatively, the CNU 140 may store a default profile and the CLT 162 may explicitly signal a different assigned profile to the CNU 140. Explicitly signaling the assigned profile may include transmitting MCS vectors that define the MCSs used in the assigned modulation profile and transmitting subcarrier vectors that specify the PRB boundaries in the assigned modulation profile. Information transmitted from the CLT 162 to CNUs 140 regarding modulation profiles may be transmitted, for example, on a PHY link channel (PLC) or using operations, administration, and management (OAM) messages.

FIG. 3C shows a second modulation profile 301 for which the modulation orders (and in some embodiments, the coding rates) used in each of the PRBs 302-1, 302-2, 302-3, and 302-4 are chosen such that the PRBs 302-1, 302-2, 302-3, and 302-4 all have a constant allowed capacity C2, which is less than C1. The frame 306 of FIG. 3C may be an upstream frame transmitted by one or more CNUs 140. For example, the four PRBs 302-1, 302-2, 302-3, and 302-4 may contain data transmitted by a single CNU 140. Alternatively, different PRBs 302-1, 302-2, 302-3, and 302-4 (or combinations thereof) may contain data transmitted by different CNUs 140 on a cable plant 150, in accordance with OFDMA. The second modulation profile 301 may be assigned to CNUs that have higher attenuation than CNUs to which the first modulation profile 300 (FIG. 3A) is assigned. The lower constant allowed capacity C2 indicates, for example, that the MCSs used in the second modulation profile 301 are more robust than the corresponding MCSs used in the first modulation profile 300 (FIG. 3A): the modulation orders and/or code rates of corresponding MCSs are lower in the second modulation profile 301 than in the first modulation profile 300.

FIG. 3D shows the frame 306 of FIG. 3C as transformed into a time-domain sequence in accordance with some embodiments. Each of the PRBs 302-1, 302-2, 302-3, and 302-4 has the same duration in the time domain. In other words, each portion of the time-domain sequence for the frame 306 that corresponds to a respective one of the PRBs 302-1, 302-2, 302-3, and 302-4 has the same duration. This duration equals the duration of the PRBs 302-1, 302-2, 302-3, and 302-4 in the time-domain sequence of FIG. 3B, despite C2 being less than C1, and is proportional to the duration of the frame 306 (e.g., is a specified fraction of an OFDM frame duration). The effective data rate for the PRBs 302-1, 302-2, 302-3, and 302-4 in the example of FIGS. 3C and 3D is less than in the example of FIGS. 3A and 3B, however, since C2 is less than C1. In some embodiments, the portions of the time-domain sequence of FIG. 3D corresponding to the PRBs 302-1, 302-2, 302-3, and 302-4 include pad bits (e.g., idle characters) inserted to achieve the same duration as in FIG. 3B, despite C2 being less than C1. The transmitting PHY discards these pads bits from the time-domain sequence received from the transmitting MAC. The receiving PHY inserts these pad bits into the time-domain sequence as provided to the receiving MAC.

The scheduler 204 (FIG. 2) may allocate bandwidth for the PRBs 302-1, 302-2, 302-3, and 302-4 by allocating times in the time domain corresponding to the PRB durations in FIG. 3D.

In some embodiments, a first modulation profile (e.g., modulation profile 300, FIG. 3A) is specified as a default modulation profile and one or more additional modulation profiles (e.g., including modulation profile 301, FIG. 3C) are defined with respect to the default modulation profile using respective offsets. The modulation orders for each additional modulation profile are shifted in the set of available modulation orders with respect to the modulation orders for the default modulation profile by an amount specified by the corresponding offset. Again, the set of available modulation orders includes Order 1, Order 2, . . . , Order N. The default modulation profile may use Order m for a first PRB and Order p for a second PRB, for example, where m and p are distinct integers less than or equal to N and greater than or equal to one. If a second modulation profile has a negative offset of one, it uses Order m+1 for the first PRB and Order p+1 for the second PRB. The absolute value of the offset (assuming a negative offset) is thus added to the indices for the modulation orders of the default modulation profile to determine the modulation orders of the additional modulation profile. (The offset is negative in this case because the modulation orders of the additional modulation profile are lower, and thus more robust, than the corresponding modulation orders of the default modulation profile.) If an additional modulation profile is defined using a positive offset, the absolute value of the offset is subtracted from the indices for the modulation orders of the default modulation profile. (The offset is positive in this case because the modulation orders of the additional modulation profile are higher, and thus less robust, than the corresponding modulation orders of the default modulation profile.)

In one example of an additional modulation profile defined by an offset, the set of available modulation orders includes 4096-QAM, 1024-QAM, 256-QAM, 64-QAM, and 16-QAM. The PRBs 302-1, 302-2, 302-3, and 302-4 of the modulation profile 300 (FIG. 3A) use respective modulation orders of 4096-QAM, 4096-QAM, 1024-QAM, and 256-QAM. If the modulation profile 301 (FIG. 3C) has a negative offset of two with respect to the modulation profile 300, then the PRBs 302-1, 302-2, 302-3, and 302-4 of the modulation profile 301 use respective modulation orders of 256-QAM, 256-QAM, 64-QAM, and 16-QAM.

When the additional modulation profiles are defined using offsets, the scheduler 204 may be unaware of available frequencies (e.g., available subcarriers). Instead, the scheduler 204 is aware of different groups of CNUs and the PRB capacities of the different groups in accordance with some embodiments.

Alternatively, the modulation orders for different modulation profiles may be specified independently. A single modulation order may be used for a respective PRB, different groups of subcarriers 308 in a PRB may use different modulation orders (e.g., with the modulation order being fixed within each PRU 310), or bit-loading may be implemented with different subcarriers in a respective PRB using different modulation orders. Bit-loading may also be performed for modulation profiles defined using offsets, such that the modulation orders for respective subcarriers are determined by applying the offset to the modulation orders used in the default modulation profile.

CNUs 140 using different modulation profiles may transmit upstream in a single OFDMA frame. In the example of FIG. 3E, the PRBs 302-1, 302-2, and 302-4 in a frame 306 have capacities C1 (e.g., in accordance with modulation profile 300, FIG. 3A) and the PRB 302-3 has a capacity C2 (e.g., in accordance with modulation profile 301, FIG. 3C). Different PRBs within a frame may thus have different allowed capacities. When the frame 306 of FIG. 3E is transformed into the time domain, resulting in the time-domain sequence of FIG. 3F, portions of the time-domain sequence for the PRBs 302-1, 302-2, 302-3, and 302-4 have the same duration, despite the PRB 302-3 having a lower capacity C2 than the capacity C1 of the PRBs 302-1, 302-2, and 302-4. This constant duration may be achieved, for example, using pad bits (e.g., idle characters), as described with respect to FIG. 3D. The MACs 206 and/or 218 are aware of (and process signals in accordance with) the different modulation profiles 300 and 301 and the corresponding chunk capacities C1 and C2, but are not aware of the available frequencies (e.g., available subcarriers 308) in accordance with some embodiments.

Figure 3G:
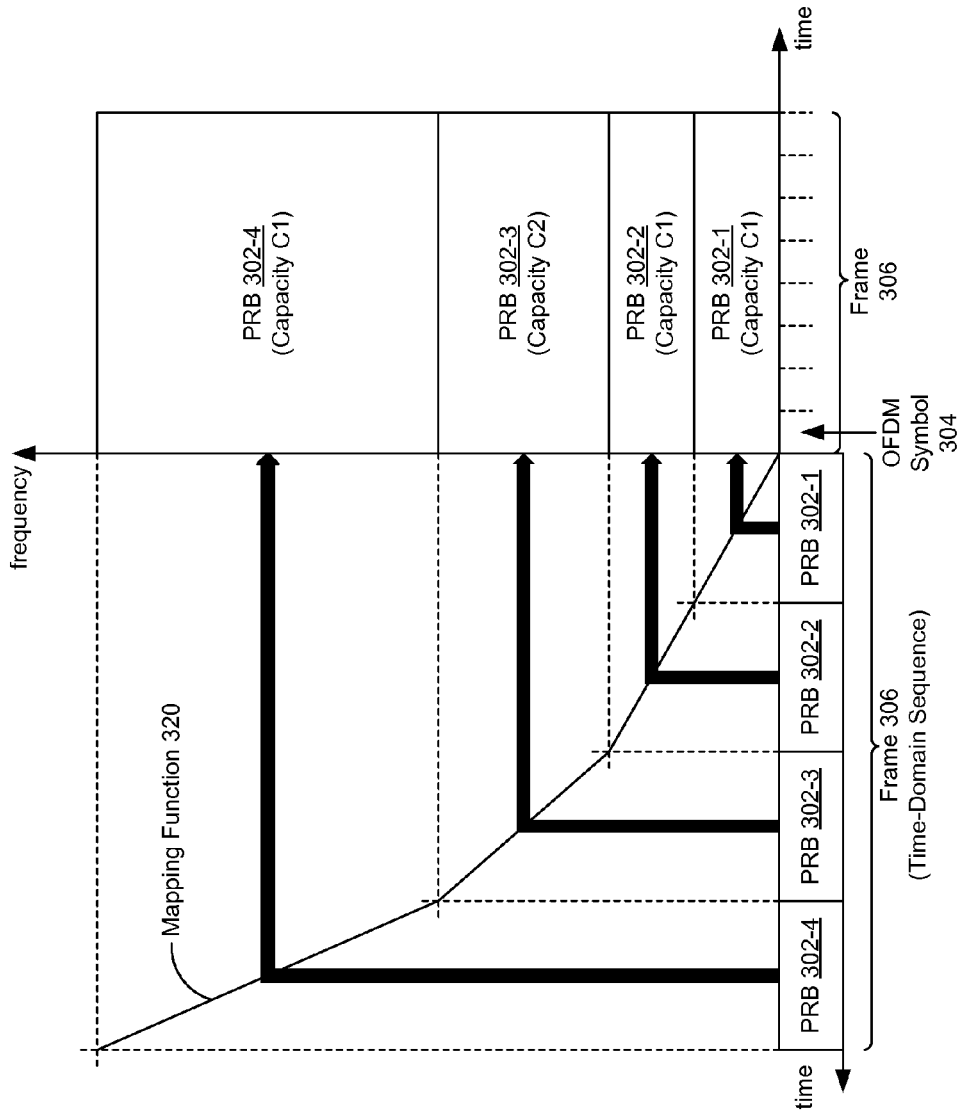
FIG. 3G shows mapping of a time-domain sequence for a frame to coax resources in the time and frequency domains, in accordance with some embodiments.

FIG. 3G shows mapping of a time-domain sequence for a frame 306 to coax resources in the time and frequency domains, in accordance with some embodiments. A mapping function 320 maps portions of the time-domain sequence for the frame 306 (e.g., as shown in FIG. 3B, 3D, or 3F) to coax resources in respective PRBs (e.g., depending on the positions of the portions in the time-domain sequence). Because the portions of the time-domain sequence all have a constant duration, regardless of their capacities and corresponding modulation profiles, a single mapping function 320 may be used. The same mapping function 320 is thus applied for all modulation profiles, regardless of capacity. In some embodiments, the mapping function 320 is implemented in a mapping module of a transmitting PHY (e.g., mapping module 225 of the coax PHY 224, FIG. 2). An inverse of the mapping function 320 is implemented in a mapping module of a receiving PHY (e.g., mapping module 213 of the coax PHY 212, FIG. 2) to map coax resources in PRBs to respective portions of a time-domain sequence for a frame 306.

Figure 3I:
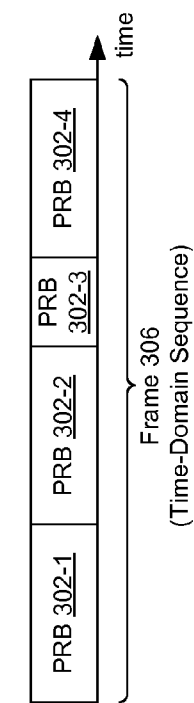
Figure 3H:
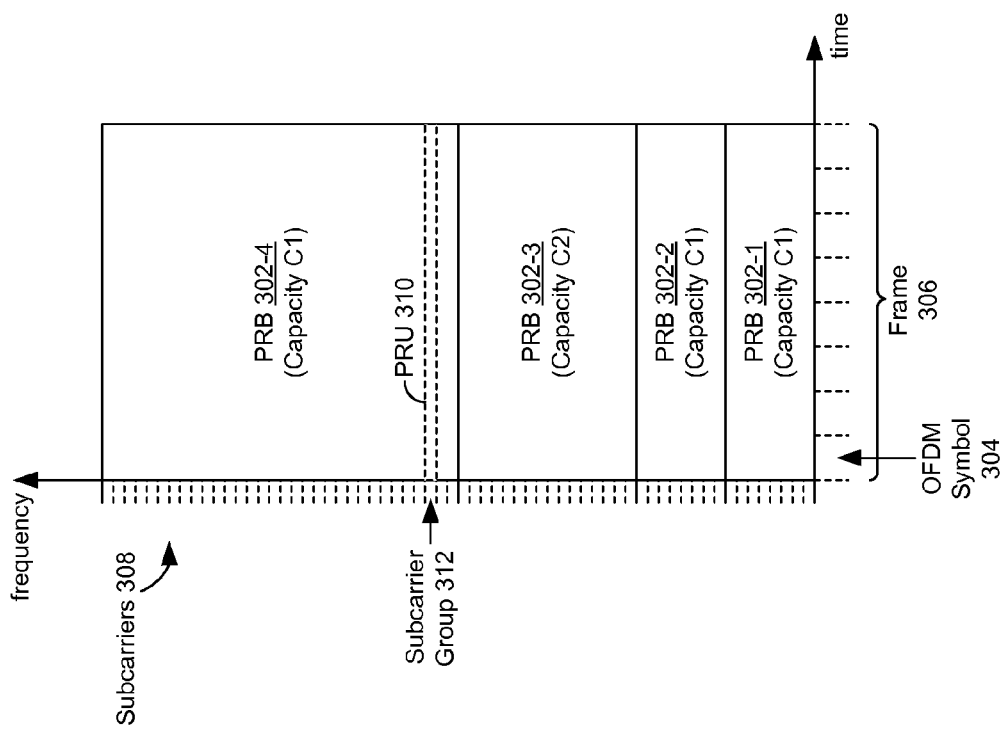

Alternatively, in some embodiments time-domain durations for different PRBs vary depending on the capacity of the PRBs. An example of this variation is shown in FIGS. 3H and 3I. FIG. 3H is a copy of FIG. 3E. FIG. 3I shows the frame 306 of FIG. 3H as transformed into the time-domain, resulting in a time-domain sequence with portions of variable duration. The portions for the PRBs 302-1, 302-2, and 302-4 have durations proportional to C1 and the portion for PRB 302-3 has a duration proportional to C2. PRB durations in the time domain are thus scaled in accordance with the differing capacities. In some embodiments, these durations are assigned by the scheduler 204 (FIG. 2). These durations are determined such that the combined duration of PRBs 302-1, 302-2, 302-3, and 302-4 equals the duration of the frame 306 (e.g., an OFDM frame). For example, the duration of each PRB 302 is determined by taking the ratio of the capacity of that PRB 302 to the overall capacity of the frame 306 and multiplying that ratio by the duration of the frame 306. The combined duration of PRBs 302-1, 302-2, 302-3, and 302-4 in the example of FIG. 3F thus equals their combined durations in the examples of FIGS. 3B and 3D. The MACs 206 and/or 218 are aware of the different modulation profiles 300 and 301 and of the corresponding chunk capacities C1 and C2, but not of the available frequencies (e.g., available subcarriers) in accordance with some embodiments.

Systems in which the durations of respective time-domain portions of a frame vary depending on capacity and modulation profile use different mapping functions to accommodate this variation. For example, a transmitting device (e.g., a CNU 140, FIG. 2) may implement a plurality of mapping functions, one for each combination of modulation profiles that may be used to construct a frame. Constructing a frame thus includes selecting a mapping function corresponding to the modulation profile or combination of modulation profiles to be used. A receiving device (e.g., a CLT 162, FIG. 2) may implement a corresponding plurality of inverse mapping functions.

Figure 4:
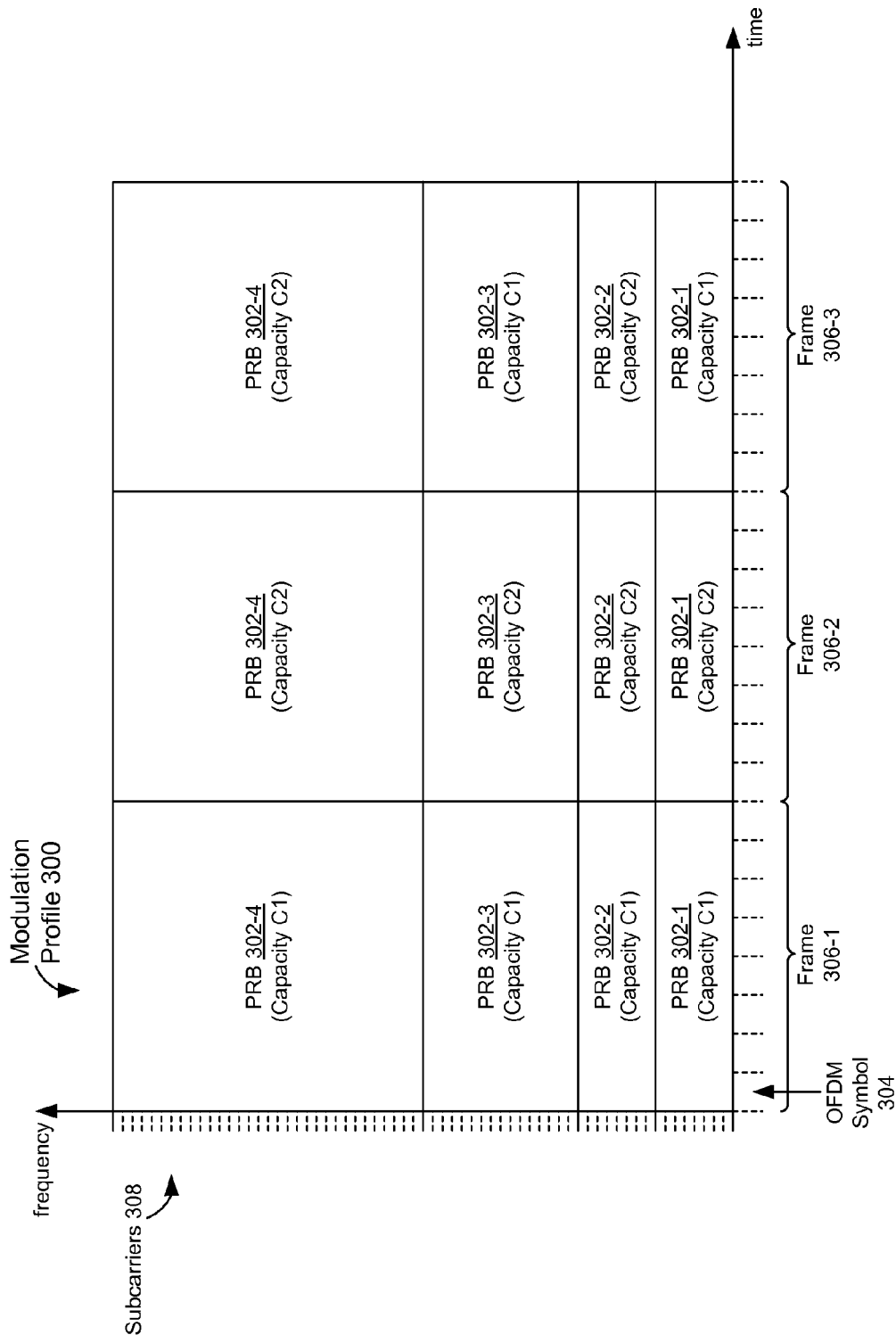
FIG. 4 shows frame-to-frame variation in the capacities of physical resource blocks based on scheduling in accordance with some embodiments.

FIG. 4 shows frame-to-frame variation in the capacities of physical resource blocks based on scheduling performed by the scheduler 204 (FIG. 2) in accordance with some embodiments. In a first frame 306-1, the PRBs 302-1 through 302-4 each have a capacity C1 and are used for upstream transmissions by one or more CNUs 140 that are assigned the first modulation profile 300. In a second frame 306-2, the PRBs 302-1 through 302-4 each have a capacity C2 and are used for upstream transmissions by one or more CNUs 140 that are assigned the second modulation profile 301. In a third frame 306-3, the PRBs 302-1 and 302-3 each have a capacity C1, while the PRBs 302-2 and 302-4 each have a capacity C2. The PRBs 302-1 and 302-3 in the third frame 306-3 are used for upstream transmissions by one or more CNUs 140 that are assigned the first modulation profile 300. The PRBs 302-2 and 302-4 in the third frame 306-3 are used for upstream transmissions by one or more CNUs 140 that are assigned the second modulation profile 301.

In some embodiments, per-CNU frequency interleaving is performed for the subcarriers in the PRB(s) assigned to respective CNUs. For example, frequency interleaving is performed within each PRB (and thus each chunk of subcarriers), with each PRB using a single modulation order. Frequency interleaving may obviate bit-loading in accordance with some embodiments.

Attention is now directed to examples of defining modulation profiles.

Figure 5A:
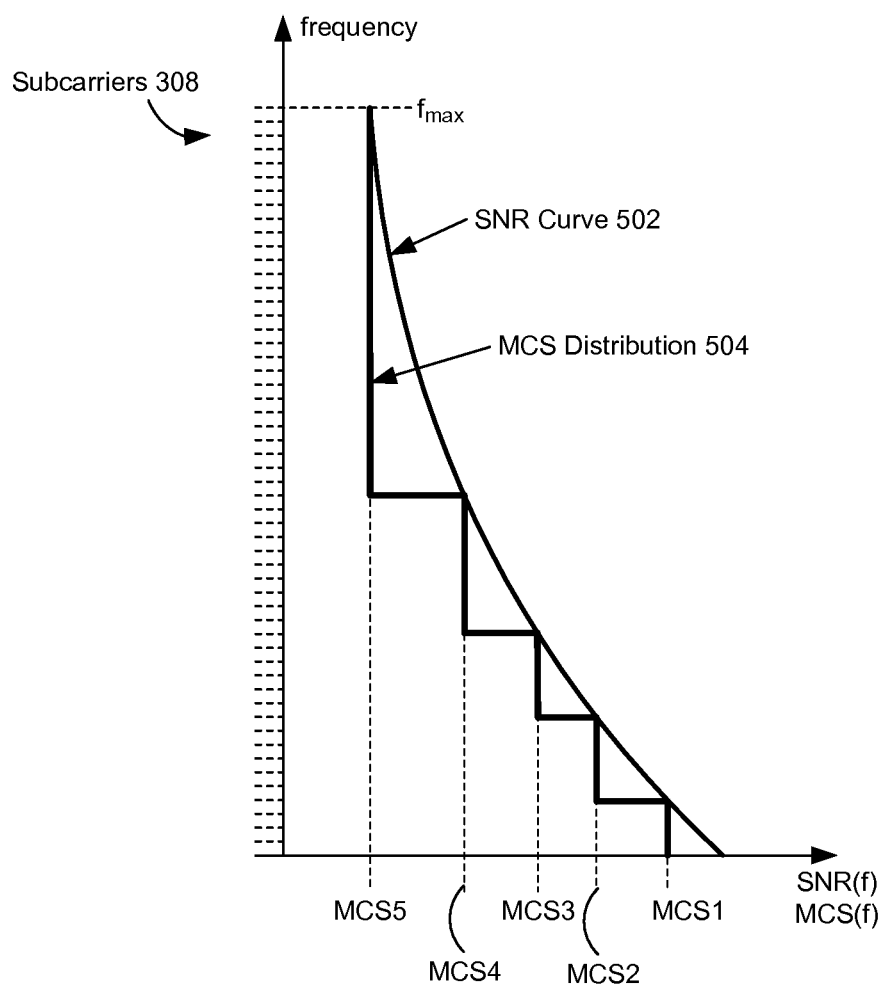
FIGS. 5A and 5B show graphs of signal-to-noise ratios and modulation and coding schemes as used in defining modulation profiles in accordance with some embodiments.

FIG. 5A shows a curve 502 of signal-to-noise ratio (SNR) values (e.g., average SNR values) as a function of frequency for a cable plant 150 (FIG. 1A) (e.g., cable plant 150-1 or 150-2, FIG. 1B) in accordance with some embodiments. The SNR curve 502 provides an SNR statistic (e.g., an average SNR value) for each subcarrier 308, where $f_{max}$ is the frequency of the highest-frequency subcarrier 308. The SNR curve 502 is created based on upstream SNR statistics for the cable plant 150, as measured for respective CNUs 140 on the cable plant 150. In some embodiments, the measurements are made online by the CLT 162, for example as part of sounding performed during registration of the CNUs 140. Alternatively, the measurements are made offline. As the SNR curve 502 shows, the SNR tends to decrease with increasing frequency.

An MCS distribution 504 is determined based on the SNR curve 502. Respective MCSs are assigned to respective groups of subcarriers 308 with SNR statistics (e.g., average SNR values) in respective ranges. In some embodiments, MCSs are assigned on a PRU-by-PRU basis, such that all subcarriers 308 within a given PRU 310 use the same MCS. PRUs 310 thus specify the granularity for MCS assignment in accordance with some embodiments. A first group of subcarriers 308 is assigned MCS1, a second group of subcarriers 308 is assigned MCS2, a third group of subcarriers 308 is assigned MCS3, a fourth group of subcarriers 308 is assigned MCS4, and a fifth group of subcarriers 308 is assigned MOSS. With regard to the MCS distribution 504, the x-axis of FIG. 5A corresponds to the inverse of robustness: MOSS is the most robust MCS (e.g., with the lowest modulation order and/or code rate) in FIG. 5A, while MCS1 is the least robust MCS (e.g., with the highest modulation order and/or code rate) in FIG. 5A. (With regard to the SNR curve 502, the x-axis of FIG. 5A corresponds to SNR values.) The more robust MCSs used for higher-frequency subcarriers 308 compensate for the lower SNR values of the higher-frequency subcarriers 308.

FIG. 5A therefore shows a mapping of subcarriers 308 to MCSs, based on SNR statistics.

Figure 5B:
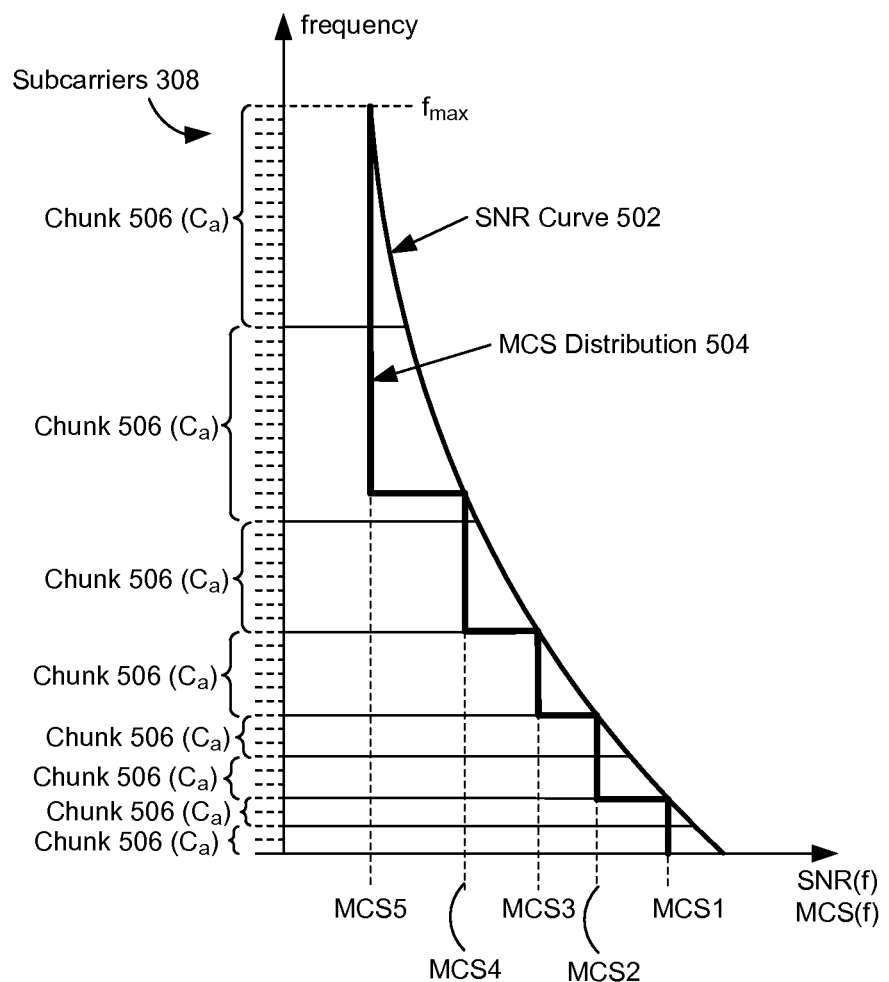

Once the MCSs have been assigned, the subcarriers 308 are divided into a specified number of chunks 506, as shown in FIG. 5B in accordance with some embodiments. In the example of FIG. 5B, the subcarriers 308 are divided into eight chunks 506. The specified number may be chosen as a compromise between granularity and efficiency on the one hand, and overhead and complexity on the other. A higher specified number of chunks 506 provides greater granularity and efficiency but increases overhead and complexity. Each of the chunks 506 corresponds to a respective PRB. For example, a PRB is defined by the combination of a chunk 506 in the frequency domain and the duration of a frame in the time domain. For the MCS distribution 504, the PRBs corresponding to the chunks 506 have a constant allowed capacity $C_a$.

In some embodiments, the chunks 506 are defined such that each corresponding chunk 506 includes a pilot symbol. For example, each PRB corresponding to a respective chunk 506 includes one or more continual pilot symbols carried on one or more corresponding subcarriers 308 in every OFDM symbol of an OFDM frame. Alternatively, or in addition, each PRB includes one or more non-continual pilot symbols.

In some embodiments, different groups of subcarriers 308 in a particular chunk 506 are assigned different MCSs. For example, in the second chunk 506 of FIG. 5B, a first group of subcarriers 308 is assigned MOSS and a second group of subcarriers 308 is assigned MCS4. The limits for respective MCSs thus may be independent of the limits for the chunks 506. In this example, the first and second groups of subcarriers 308 each correspond to an integer number of PRUs 310, such that the MCSs are assigned on a PRU-by-PRU basis. Alternatively, all of the subcarriers 308 in a particular chunk 506 are assigned the same MCS, as shown for the other chunks 506 of FIG. 5B. Since each of the other chunks 506 corresponds to an integer number of PRUs 310, this also is an example of MCS assignment on a PRU-by-PRU basis. In still other examples, bit-loading is performed, such that MCSs are assigned on a subcarrier-by-subcarrier basis.

Figure 6:
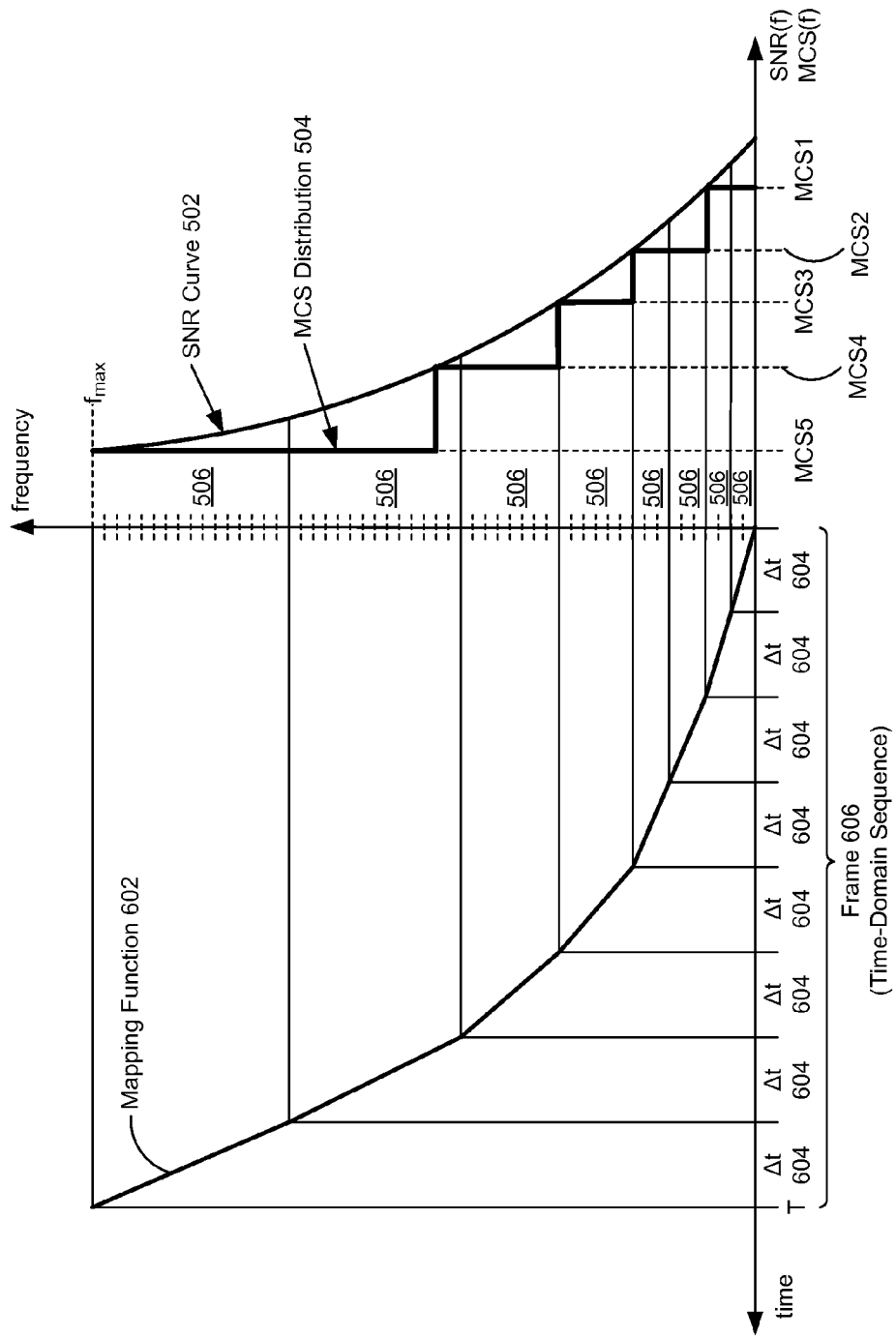
FIG. 6 shows mapping of time-domain resources to coax resources in the time and frequency domains, in accordance with some embodiments.

FIG. 6 shows a time-domain sequence that corresponds to the time-domain resources for a frame 606. The time-domain sequence for the frame 606 has a duration T and is divided into equal portions 604 (i.e., equal periods) of duration $\Delta t$. The duration $\Delta t$ equals T divided by the number of portions 604. The number of portions 604 equals the number of chunks 506, and therefore the number of PRBs per frame. A mapping function 602 is defined to map respective portions 604 of the time-domain sequence to PRBs corresponding to respective chunks 506. FIG. 6 thus shows mapping of time-domain resources to coax resources in the time and frequency domains, in accordance with some embodiments.

The mapping function 602 may be implemented at the PHY level (e.g., in the mapping modules 213 and 225 of the coax PHYs 212 and 224.) The scheduler 204 thus is frequency-unaware and performs scheduling by assigning respective portions 604 (and therefore respective time-domain resources) to respective CNUs 140. The MACs 206 and 218 process frames 606 in the time domain, while the coax PHYs 212 and 224 map the portions 604 to corresponding PRBs (and vice-versa). For example, a CNU 140 translates the status of a buffer storing upstream traffic into time quanta (e.g., in integer or fractional units of the duration Δt) and specifies the time quanta in a REPORT message sent to the CLT 162. In response, the scheduler 204 allocates time-domain resources (e.g., in integer units of Δt) to the CNU 140. This allocation is specified in a GRANT message sent to the CNU 140. The MAC 218 prepares a time-domain sequence using the allocated time-domain resources, and the coax PHY 224 maps this time-domain sequence to corresponding PRBs using the mapping function 602.

Once the MCSs have been assigned, the chunks 506 have been defined, and the mapping function 602 has been defined, definition of a modulation profile is complete. In some embodiments, a default modulation profile is defined in this matter.

Figure 7:
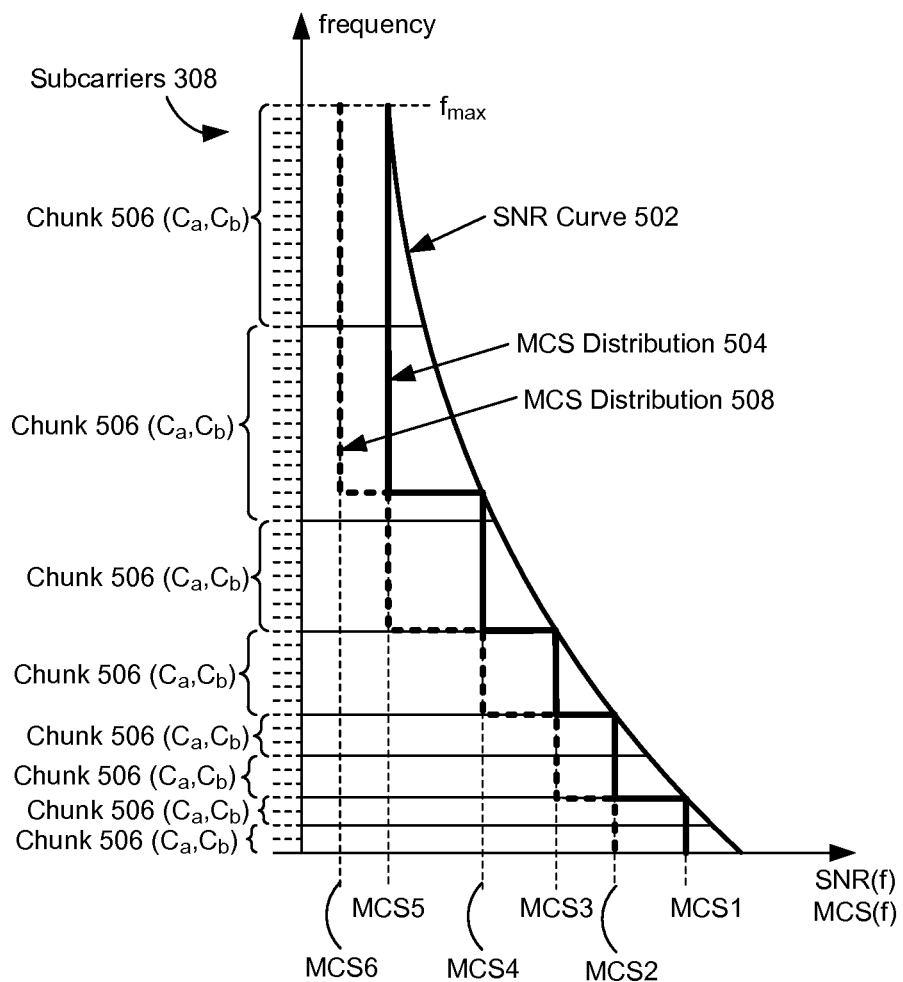
FIG. 7 shows two distributions of modulation and coding schemes for use in two respective modulation profiles in accordance with some embodiments.

Additional modulation profiles may be defined by defining additional MCS distributions while maintaining the chunks 506 and mapping function 602 as defined for the default modulation profile. FIG. 7 shows a second MCS distribution 508 in addition to the first MCS distribution 504. Each group of subcarriers 308 that was assigned a respective MCS in the first MCS distribution 504 is assigned a lower (i.e., more robust) MCS in the second MCS distribution 508. (Alternatively, each group of subcarriers 308 is assigned a less robust MCS than in the first MCS distribution 504). For example, the group of subcarriers 308 that was assigned MOSS in the first MCS distribution 504 is assigned MCS6 in the second MCS distribution 508, where MCS6 is more robust than MOSS. The MCS distributions 504 and 508 are thus parallel, with steps as shown in FIG. 7. When using the second MCS distribution 508, each PRB corresponding to a chunk 506 has a constant allowed capacity $C_b$, which is lower than $C_a$.

Each CNU 140 in a cable plant 150 uses one of the available modulation profiles, as determined based on SNR values (e.g., on an overall effective SNR offset) for each CNU 140. In the example of FIG. 7, each CNU 140 uses either the profile corresponding to the MCS distribution 504 or the profile corresponding to the MCS distribution 508.

FIG. 8 again shows the time-domain sequence for the frame 606. The mapping function 602 maps respective portions 604 of the time-domain sequence to PRBs corresponding to respective chunks 506. Either the first MCS distribution 504 or the second MCS distribution 508 is chosen for each PRB, depending on the modulation profile of the CNU 140 that uses the respective chunk 506 for transmission. The allowed capacity of each PRB is determined by the MCS distribution corresponding to the profile of the CNU 140 to which that PRB is assigned, since all of the PRBs for each MCS distribution have a respective constant allowed capacity.

Figure 8:
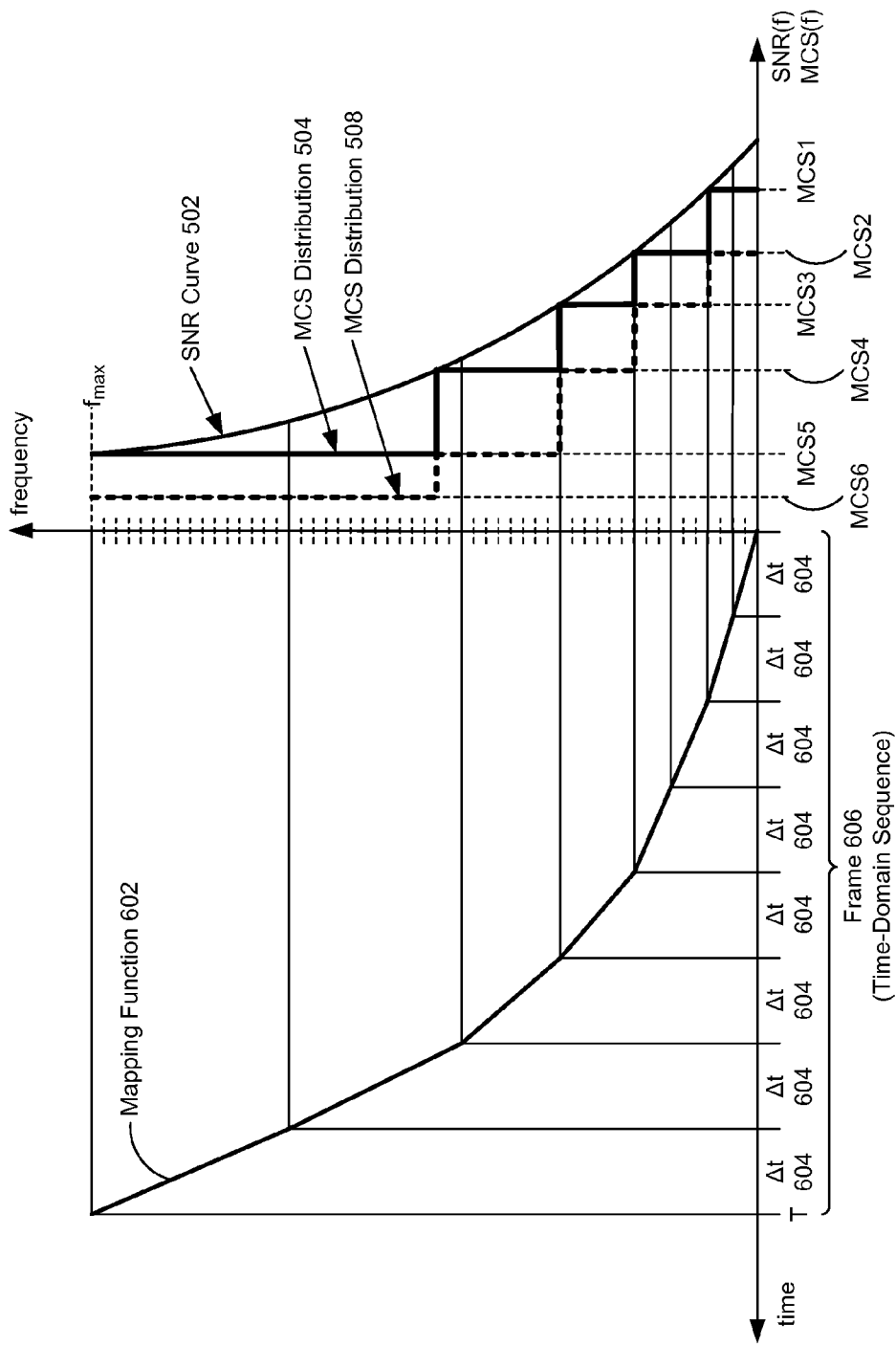
FIG. 8 shows mapping of time-domain resources to coax resources in the time and frequency domains for multiple modulation profiles, in accordance with some embodiments.

FIG. 8 thus illustrates that multiple modulation profiles may use the same mapping function 602.

A specific example of modulation profile generation is now provided, with respect to the modulation profile corresponding to the first MCS distribution 504. Five MCSs are used for the modulation profile. Each PRU (e.g., each PRU 310, FIG. 3A) is assigned the MCS that provides the highest possible data rate while satisfying predefined criteria regarding signal quality. The capacity of each PRU is determined and summed across the PRUs 310, to determine the total capacity of the frame. Table 1 illustrates this process, assuming 16 subcarriers 308 per PRU 310 and eight OFDM symbols per frame. The PRU capacity (in bits) is determined by multiplying the number of subcarriers 308 per PRU times the number of OFDM symbols per frame times the number of bits per modulation symbol times the code rate. For example, 1024QAM has 10 bits per modulation symbol (since $2^{10}=1024$) and QPSK has 2 bits per modulation symbol.

TABLE 1

| MCS | Modulation Order | Code Rate | PRU Capacity (bits) | # of PRUs per frame | Total Capacity |
|---|---|---|---|---|---|
| MCS1 | 1024QAM | r = 8/9 | 1137 | 4 | 4548 |
| MCS2 | 256QAM | r = 3/4 | 768 | 6 | 4608 |
| MCS3 | 64QAM | r = 1/2 | 384 | 6 | 2304 |
| MCS4 | 16QAM | r = 1/2 | 256 | 8 | 2048 |
| MCS5 | QPSK | r = 2/3 | 170 | 30 | 5100 |

Summing the "Total Capacity" column of Table 1 results in a total capacity of 18,608 bits per frame. The total capacity is divided by the number of PRBs (i.e., the number of chunks 506) to determine the allowed capacity for each PRB. Assuming eight PRBs, the allowed capacity per PRB is 2326.

Once the allowed capacity has been determined, PRUs are grouped into PRBs to match the allowed capacity. While the allowed capacity serves as a target capacity for purposes of grouping the PRUs into PRBs, the total capacity of each PRB may not precisely match the allowed capacity. If the total capacity is greater than the allowed capacity, repetition is performed to conform to the allowed capacity. If the total capacity is less than the allowed capacity, puncturing is performed to conform to the allowed capacity. Table 2 shows the grouping of PRUs into PRBs for the present example, assuming eight PRBs. The "amount of puncturing" equals the allowed capacity minus the total capacity (in bits). The "amount of repetition" equals the total capacity minus the allowed capacity (in bits).

TABLE 2

| PRB # | # of PRUs (and their MCSs) | PRB Total Capacity (bits) | Amount of Puncturing | Amount of Repetition |
|---|---|---|---|---|
| 1 | 2*MCS1 | 2*1137 = 2274 | 52 | — |
| 2 | 2*MCS1 | 2*1137 = 2274 | 52 | — |
| 3 | 3*MCS2 | 3*768 = 2304 | 22 | — |
| 4 | 3*MCS2 | 3*768 = 2304 | 22 | — |
| 5 | 6*MCS3 | 6*384 = 2304 | 22 | — |
| 6 | 8*MCS4 | 8*256 = 2048 | 278 | — |
| 7 | 2*MCS4 + 12*MCS5 | 2*256 + 12*170 = 2552 | — | 226 |
| 8 | 16*MCS5 | 16*170 = 2720 | — | 394 |

In some embodiments, puncturing is performed by randomly removing bits after performing FEC encoding. The receiving device will use FEC to attempt to recover the removed bits. Alternatively, puncturing is performed by using fewer FEC bits than specified by the code rate, in a process known as code shortening. In some embodiments, puncturing is not allowed. Instead, the PRBs are defined such that their total capacities are always greater than or equal to the allowed capacity.

Repetition may be performed by repeating data. Alternatively, pad bits (e.g., zeros) are added to conform to the allowed capacity.

Puncturing and repetition may be performed at the PHY level (e.g., in the coax PHYs 212 and 224, FIG. 2). These processes may be referred to as rate matching.

Attention is now directed to methods of operating a CLT 162 and a CNU 140.

Figure 9A:
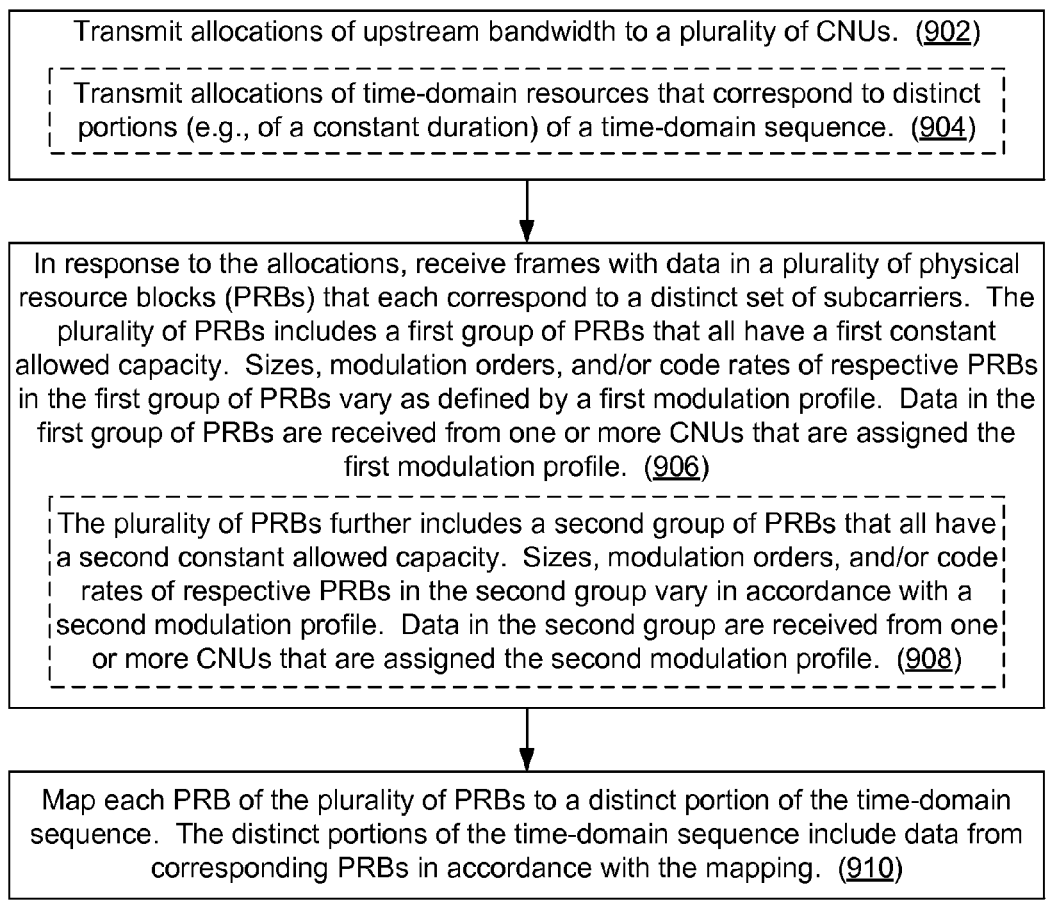
FIG. 9A is a flowchart showing a method of operating a coax line terminal in accordance with some embodiments.

FIG. 9A is a flowchart showing a method 900 of operating a CLT 162 in accordance with some embodiments. In the method 900, allocations of upstream bandwidth are transmitted (902) to a plurality of CNUs 140. For example, allocations of time-domain resources that correspond to distinct portions (e.g. portions 604, FIGS. 6 and 8) of a time-domain sequence are transmitted (904) to the plurality of CNUs 140. The distinct portions may have constant (i.e., substantially equal) durations. The time-domain sequence may correspond to one or more frames 306 (FIGS. 3B, 3D, 3F, and 3I) or frames 606 (FIGS. 6 and 8).

In response to the allocations, frames (e.g., OFDMA frames that each include one or more OFDM symbols, such as the frames 306 and 606) are received (906) with data in a plurality of PRBs that each correspond to a distinct set of subcarriers. Examples of the plurality of PRBs include, but are not limited to, the PRBs 302-1 through 302-4 (FIGS. 3A, 3C, 3E, and 3H) and PRBs corresponding to the chunks 506 (FIGS. 5B-8). The plurality of PRBs includes a first group of PRBs that all have a first constant allowed capacity (e.g., C1, FIGS. 3A, 3E, and 3H; $C_a$, FIGS. 5B and 7). Sizes, modulation orders, and/or code rates of respective PRBs in the first group of PRBs vary as defined by a first modulation profile (e.g., as shown in Tables 1 and 2). Data in the first group of PRBs are received from one or more CNUs 140 that are assigned the first modulation profile. For example, data in the first group of PRBs are received from multiple CNUs 140 that are assigned the first modulation profile, which respective PRBs being received from respective CNUs.

In some embodiments, a PRB of the first group has a total capacity that is less than the first constant allowed capacity. The CLT 162 uses FEC to recover data that a transmitting CNU 140 omitted from the PRB (e.g., by performing puncturing, as described with respect to Table 2) to comply with the first constant allowed capacity.

In some embodiments, a PRB of the first group has a total capacity that is greater than the first constant allowed capacity. The CLT 162 discards extra bits that a transmitting CNU 140 included in the PRB (e.g., by performing repetition or otherwise adding pad bits, as described with respect to Table 2) to comply with the first constant allowed capacity. If the extra bits are repeated data bits, the CLT 162 may use the repeated data bits for enhanced FEC.

In some embodiments, the plurality of PRBs further includes (908) a second group of PRBs that all have a second constant allowed capacity (e.g., C2, FIGS. 3C, 3E, and 3H; Cb, FIG. 7). Sizes, modulation orders, and/or code rates of respective PRBs in the second group vary in accordance with a second modulation profile (e.g., modulation profile 301, FIG. 3C). Data in the second group are received from one or more CNUs 140 that are assigned the second modulation profile.

Each PRB of the plurality of PRBs is mapped (910) to a distinct portion of the time-domain sequence (e.g., in accordance with a mapping function 320, FIG. 3G, or 602, FIGS. 6 and 8). The distinct portions of the time-domain sequence include data from corresponding PRBs in accordance with the mapping.

Figure 9B:
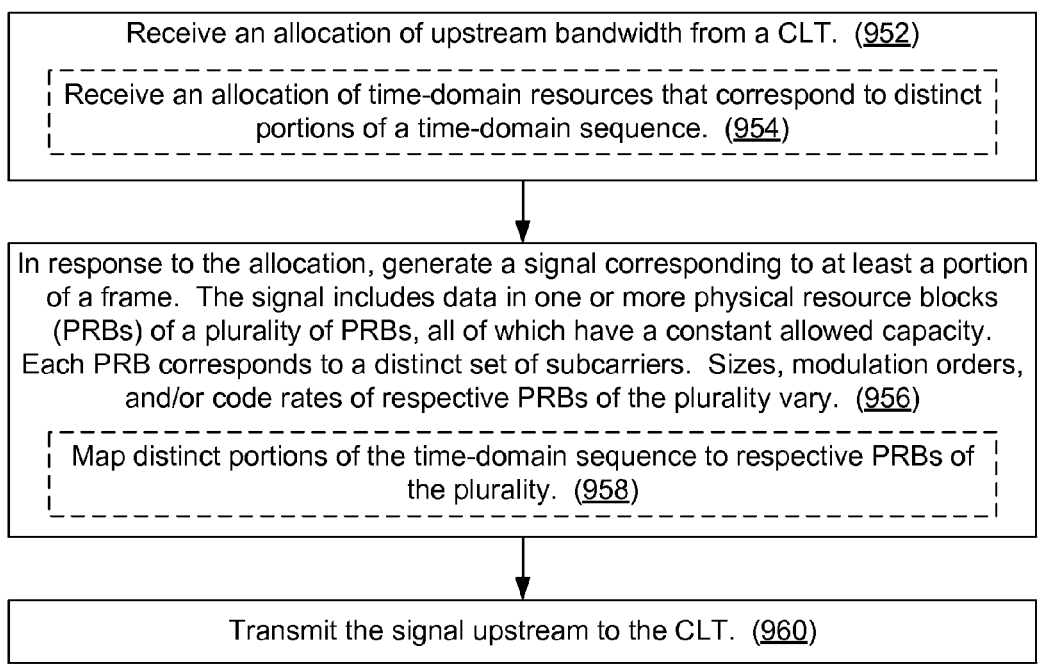
FIG. 9B is a flowchart showing a method of operating a coax network unit in accordance with some embodiments.

FIG. 9B is a flowchart showing a method 950 of operating a CNU 140 in accordance with some embodiments. In the method 950, an allocation of upstream bandwidth is received (952) from a CLT 162. For example, an allocation of time-domain resources that correspond to distinct portions (e.g. portions 604, FIGS. 6 and 8) of a time-domain sequence is received (954) from the CLT 162. The distinct portions may have constant (i.e., equal) durations. The time-domain sequence may correspond to one or more frames 306 (FIGS. 3B, 3D, 3F, and 3I) or frames 606 (FIGS. 6 and 8), or to a portion of a frame 306 or frame 606.

In response to the allocation, a signal is generated (956) that corresponds to at least a portion of a frame (e.g., an OFDMA frame that includes one or more OFDM symbols). The signal includes data in one or more PRBs of a plurality of PRBs, all of which have a constant allowed capacity (e.g., C1, FIGS. 3A, 3E, and 3H; C2, FIGS. 3C, 3E, and 3H; $C_a$, FIGS. 5B and 7; $C_b$, FIG. 7). Each PRB corresponds to a distinct set of subcarriers. Sizes, modulation orders, and/or code rates of respective PRBs of the plurality vary (e.g., as shown in Tables 1 and 2). Examples of the plurality of PRBs include, but are not limited to, the PRBs 302-1 through 302-4 (FIGS. 3A, 3C, 3E, and 3H) and PRBs corresponding to the chunks 506 (FIGS. 5B-8).

The constant allowed capacity, modulation orders, and code rates may be defined by a modulation profile assigned to the CNU 140 (e.g., based on sounding).

In some embodiments, generating the signal includes mapping (958) distinct portions of the time-domain sequence to respective PRBs of the plurality (e.g., in accordance with a mapping function 320, FIG. 3G, or 602, FIGS. 6 and 8).

In some embodiments, a PRB has a total capacity that is less than the constant allowed capacity. Generating the signal includes performing FEC encoding and omitting data from the PRB after performing the FEC encoding, to comply with the constant allowed capacity. For example, puncturing is performed (e.g., as described with respect to Table 2). Alternatively, generating the signal includes performing code shortening for the PRB to comply with the constant allowed capacity.

In some embodiments, a PRB has a total capacity that is greater than the constant allowed capacity. Generating the signal includes adding extra bits to the PRB to comply with the first constant allowed capacity. For example, repetition is performed (e.g., as described with respect to Table 2).

The signal is transmitted (960) upstream to the CLT 162.

Figure 10:
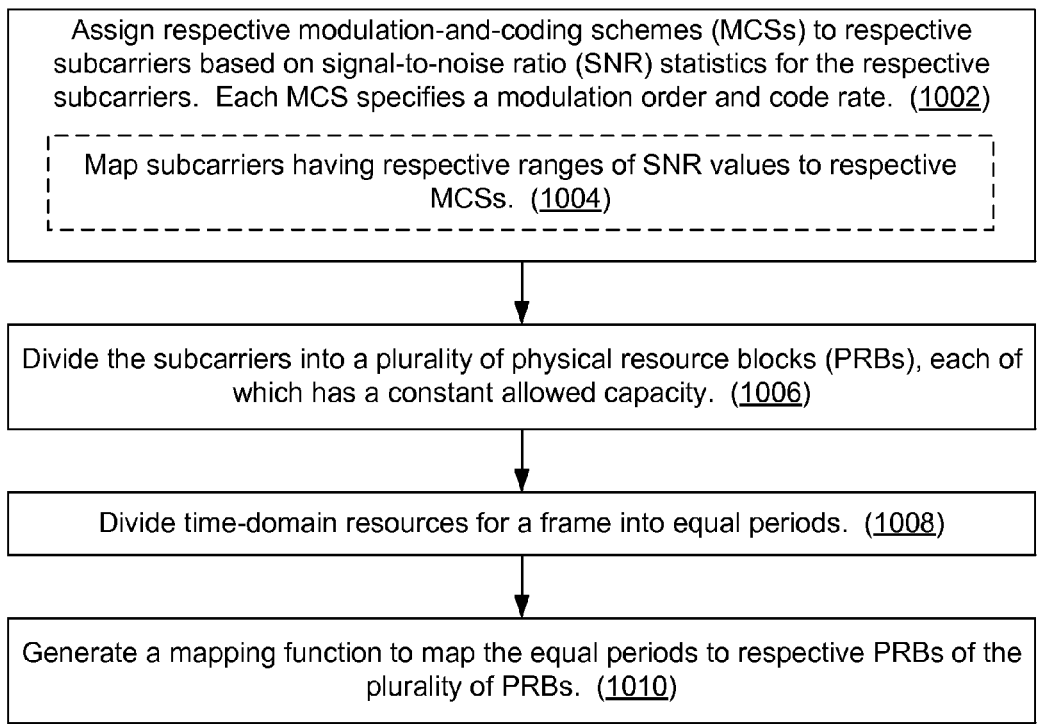
FIG. 10 is a flowchart showing a method of defining a modulation profile in accordance with some embodiments.

FIG. 10 is a flowchart showing a method 1000 of defining a modulation profile in accordance with some embodiments. In some embodiments, the method 1000 is performed by a CLT 162 (e.g., in an FCU 130-1 or 130-2, FIG. 1B). The method 1000 may be performed in conjunction with (e.g., before) the method 900 (FIG. 9A).

In the method 1000, respective modulation-and-coding schemes (MCSs) are assigned (1002) to respective subcarriers (e.g., on a PRU-by-PRU basis, such that the MCS is constant per PRU) based on signal-to-noise ratio (SNR) statistics for the respective subcarriers (e.g., as shown in FIG. 5A). Each MCS specifies a modulation order and code rate. In some embodiments, assigning the MCSs includes mapping (1004) subcarriers having respective ranges of SNR values to respective MCSs. These assignments apply across multiple frames.

The subcarriers are divided (1006) into a plurality of PRBs, each of which has a constant allowed capacity (e.g., as shown in FIG. 5B). In some embodiments, each PRB is an integer number of PRUs, such that the division of subcarriers into PRBs respects PRU boundaries. In some embodiments, each PRB is assigned a single MCS. In some other embodiments, a first MCS is assigned to a first portion of a PRB and a second MCS is assigned to a second portion of the PRB. A PRB thus may include multiple portions that are assigned distinct MCSs.

Time-domain resources for a frame are divided (1008) into equal periods (e.g., portions 604 of a time-domain sequence for a frame 606, FIG. 6).

A mapping function (e.g., mapping function 602, FIG. 6; mapping function 320, FIG. 3) is generated (1010) to map the equal periods to respective PRBs of the plurality of PRBs.

Once the mapping function has been generated, definition of the modulation profile is complete. In some embodiments, the resulting modulation profile is a default modulation profile. Additional modulation profiles may then be defined (e.g., as described with respect to FIGS. 7 and 8).

While the methods 900, 950, and 1000 include a number of operations that appear to occur in a specific order, it should be apparent that the methods 900, 950, and 1000 can include more or fewer operations, some of which can be executed serially or in parallel. An order of some operations may be changed, performance of some operations may overlap, and some operations may be combined into a single operation.

In some embodiments, the data-link layer functionality as described herein is implemented in software.

Figure 11A:
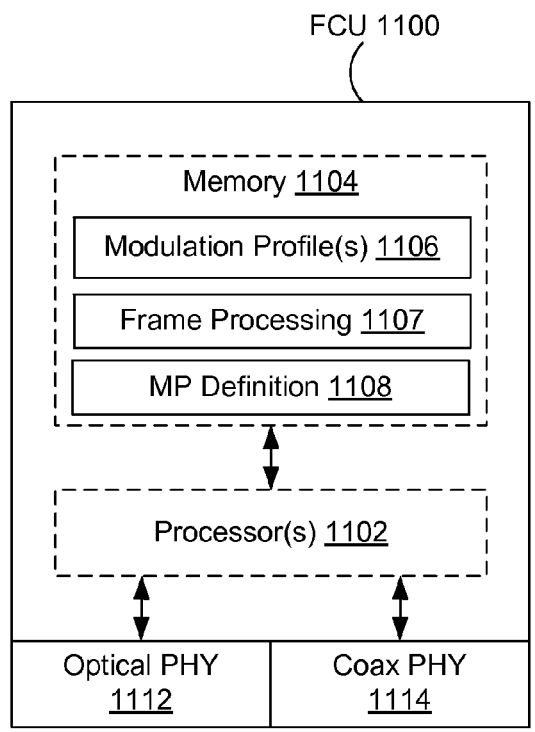
FIG. 11A is a block diagram of a fiber-coax unit in accordance with some embodiments.

For example, FIG. 11A is a block diagram of an FCU 1100 in a network such as the network 105 (FIG. 1B) in accordance with some embodiments. The FCU 1100 is an example of an FCU 130-1 or 130-2 (FIG. 1B). In the FCU 1100, an optical PHY 1112 and coax PHY 1114 (e.g., coax PHY 212, FIG. 2) are coupled to one or more processors 1102, which are coupled to memory 1104. In some embodiments, the memory 1104 includes a non-transitory computer-readable medium (e.g., one or more nonvolatile memory elements, such as EPROM, EEPROM, Flash memory, a hard disk drive, and so on) that stores instructions for execution by the one or more processors 1102. The instructions include frame processing instructions 1107 that, when executed by the processor(s) 1102, cause the FCU 1100 to implement the functionality of the MPCP implementation 202 (including the scheduler 204) and/or MAC 206 (FIG. 2). For example, the frame processing instructions 1107, when executed by the processor(s) 1102, cause the FCU 1100 to perform at least a portion of the method 900 (FIG. 9A). The instructions also include modulation profile (MP) definition instructions 1108 that, when executed by the processor(s) 1102, cause the FCU 1100 to define modulation profiles (e.g., as described with respect to FIGS. 5A-8). For example, the frame MP definition instructions 1108, when executed by the processor(s) 1102, cause the FCU 1100 to perform the method 1000 (FIG. 10). The memory 1104 may also store one or more modulation profiles 1106.

In some embodiments, the FCU 1100 may be replaced with a CLT (e.g., a CLT 162, FIGS. 1A-1B) that includes the coax PHY 1114 (e.g., coax PHY 212, FIG. 2), the one or more processors 1102, and the memory 1104.

While the memory 1104 is shown as being separate from the processor(s) 1102, all or a portion of the memory 1104 may be embedded in the processor(s) 1102. In some embodiments, the processor(s) 1102 and/or memory 1104 are implemented in the same integrated circuit as the optical PHY 1112 and/or coax PHY 1114. For example, the coax PHY 1114 may be integrated with the processor(s) 1102 in a single chip, while the memory 1104 and optical PHY 1112 are implemented in separate chips. In another example, the elements 1112, 1114, 1104, and 1102 are all integrated in a single chip.

Figure 11B:
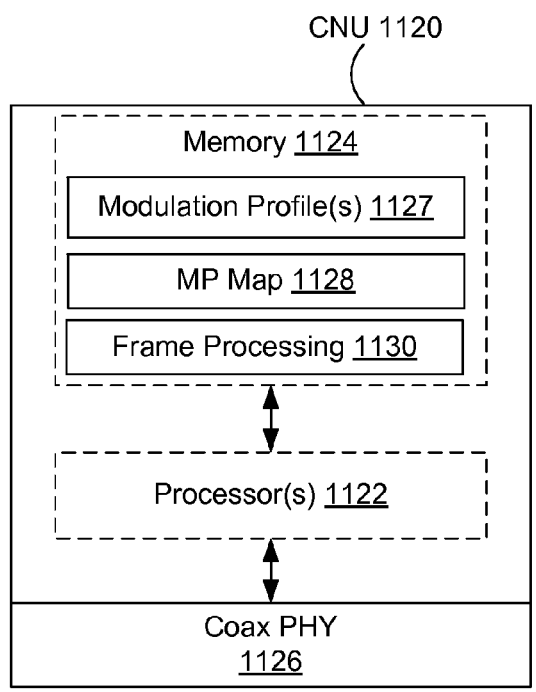
FIG. 11B is a block diagram of a coax network unit in accordance with some embodiments.

FIG. 11B is a block diagram of a CNU 1120 in accordance with some embodiments. The CNU 1120 is an example of a CNU 140 (FIGS. 1A-1B). In the CNU 1120, the coax PHY 1126 (e.g., coax PHY 224, FIG. 2) is coupled to one or more processors 1122, which are coupled to memory 1124. In some embodiments, the memory 1124 includes a non-transitory computer-readable medium (e.g., one or more nonvolatile memory elements, such as EPROM, EEPROM, Flash memory, a hard disk drive, and so on) that stores instructions for execution by the one or more processor cores 1122. The instructions include frame processing instructions 1130 that, when executed by the processor(s) 1122, cause the CNU 1120 to implement the functionality of the MPCP implementation 216 and/or MAC 218 (FIG. 2). For example, the frame processing instructions 1130, when executed by the processor(s) 1122, cause the CNU 1120 to perform at least a portion of the method 950 (FIG. 9B). The memory 1124 may also store one or more modulation profiles 1127 and a map 1128 of the modulation profiles 1127.

While the memory 1124 is shown as being separate from the processor(s) 1122, all or a portion of the memory 1124 may be embedded in the processor(s) 1122. In some embodiments, the processor(s) 1122 and/or memory 1124 are implemented in the same integrated circuit as the coax PHY 1126. For example, the coax PHY 1126 may be integrated with the processor(s) 1122 in a single chip, which may or may not also include the memory 1124.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of operating a coax line terminal (CLT), comprising:
   transmitting allocations of upstream bandwidth to a plurality of coax network units (CNUs); and
   in response to the allocations, receiving frames with data in a plurality of physical resource blocks that each correspond to a distinct set of subcarriers, the plurality of physical resource blocks comprising a first group of physical resource blocks that all have a first constant allowed capacity and a second group of physical resource blocks that all have a second constant allowed capacity;
   wherein the data in the first group are received from one or more CNUs assigned a first modulation profile and the data in the second group are received from one or more CNUs assigned a second modulation profile; and
   wherein sizes and modulation orders of respective physical resource blocks in the first group vary as defined by the first modulation profile and sizes and modulation orders of respective physical resource blocks in the second group vary in accordance with the second modulation profile.

2. The method of claim 1, wherein code rates of respective physical resource blocks in the first group vary as defined by the first modulation profile.

3. The method of claim 1, wherein the frames comprise orthogonal frequency-division multiple access (OFDMA) frames, the OFDMA frames each comprising a plurality of orthogonal frequency-division multiplexing (OFDM) symbols.

4. The method of claim 1, wherein:
the one or more CNUs assigned the first modulation profile comprise a plurality of CNUs assigned the first modulation profile; and
the receiving comprises receiving data in respective physical resource blocks of the first group from respective CNUs of the plurality of CNUs assigned the first modulation profile.

5. The method of claim 1, wherein code rates of respective physical resource blocks in the second group vary in accordance with the second modulation profile.

6. The method of claim 1, further comprising mapping each physical resource block of the plurality of physical resource blocks to a distinct portion of a time-domain sequence, wherein the distinct portions of the time-domain sequence include data from corresponding physical resource blocks in accordance with the mapping.

7. The method of claim 6, wherein the distinct portions of the time-domain sequence have a constant duration.

8. The method of claim 6, wherein transmitting the allocations of upstream bandwidth comprises transmitting allocations of time-domain resources that correspond to the distinct portions of the time-domain sequence.

9. The method of claim 1, wherein:
a first physical resource block of the first group has a total capacity that is less than the first constant allowed capacity; and
the method further comprises using forward error correction (FEC) coding to recover data that a transmitting CNU omitted from the first physical resource block to comply with the first constant allowed capacity.

10. A method of operating a coax line terminal (CLT), comprising:
transmitting allocations of upstream bandwidth to a plurality of coax network units (CNUs);
in response to the allocations, receiving frames with data in a plurality of physical resource blocks that each correspond to a distinct set of subcarriers, the plurality of physical resource blocks comprising a first group of physical resource blocks that all have a first constant allowed capacity, wherein a first physical resource block of the first group has a total capacity that is greater than the first constant allowed capacity;
discarding extra bits that a transmitting CNU included in the first physical resource block to comply with the first constant allowed capacity;
wherein the data in the first group are received from one or more CNUs assigned a first modulation profile; and
wherein sizes and modulation orders of respective physical resource blocks in the first group vary as defined by the first modulation profile.

11. The method of claim 1, wherein:
a first physical resource block of the first group has a total capacity that is greater than the first constant allowed capacity; and
the method further comprises using repeated bits in the first physical resource block to enhance FEC decoding, wherein a transmitting CNU included the repeated bits in the first physical resource block to comply with the first constant allowed capacity.

12. The method of claim 1, further comprising defining the first modulation profile, the defining comprising:
assigning respective modulation-and-coding schemes (MCSs) to respective subcarriers based on signal-to-noise ratio (SNR) statistics for the respective subcarriers, wherein each MCS specifies a modulation order and code rate; and
dividing the subcarriers into the plurality of physical resource blocks.

13. The method of claim 12, wherein the assigning comprises mapping subcarriers having respective ranges of SNR values to respective MCSs.

14. The method of claim 12, wherein the assigning comprises assigning a single MCS to each physical resource block of the plurality of physical resource blocks.

15. The method of claim 12, wherein the assigning comprises assigning a first MCS to a first portion of a first physical resource block of the first group and a second MCS to a second portion of the first physical resource block.

16. The method of claim 12, further comprising:
dividing time-domain resources for a frame into equal periods; and
generating a mapping function to map the equal periods to respective physical resource blocks of the plurality of physical resource blocks.

17. The method of claim 16, further comprising defining a second modulation profile, wherein:
defining the second modulation profile comprises assigning respective MCSs to the respective subcarriers and dividing the subcarriers into the plurality of physical resource blocks, wherein respective subcarriers are assigned distinct MCSs in the first and second modulation profiles; and
the mapping function applies to the first and second modulation profiles.

18. A coax line terminal (CLT), comprising: a scheduler to allocate upstream bandwidth for a plurality of coax network units (CNUs); and a physical-layer device (PHY) to: transmit allocations of upstream bandwidth, as determined by the scheduler, to the plurality of CNUs; and receive frames with data in a plurality of physical resource blocks that each correspond to a distinct set of subcarriers, the plurality of physical resource blocks comprising a first group of physical resource blocks that all have a first constant allowed capacity and a second group of physical resource blocks that all have a second constant allowed capacity; wherein sizes and modulation orders of respective physical resource blocks in the first group vary as defined by a first modulation profile and sizes and modulation orders of respective physical resource blocks in the second group vary as defined by a second modulation profile.

19. The CLT of claim 18, wherein code rates of respective physical resource blocks in the first group vary as defined by the first modulation profile.

20. The CLT of claim 18, wherein the PHY comprises a mapping module to map each physical resource block of the plurality of physical resource blocks to a distinct portion of a time-domain sequence,
wherein the distinct portions of the time-domain sequence are to include data from corresponding physical resource blocks as specified by the mapping module.

21. The CLT of claim 20, wherein the scheduler is to allocate time-domain resources that correspond to the distinct portions of the time-domain sequence.

22. The CLT of claim 18, wherein:
a first physical resource block of the first group has a total capacity that is less than the first constant allowed capacity; and
the PHY is to perform forward error correction (FEC) decoding to recover data omitted from the first physical resource block to comply with the first constant allowed capacity.

23. The CLT of claim 18, wherein:
a first physical resource block of the first group has a total capacity that is greater than the first constant allowed capacity; and
the PHY is to use extra bits in the first physical resource block to enhance FEC decoding, the extra bits being included in the first physical resource block to comply with the first constant allowed capacity.

24. The CLT of claim 18, wherein:
a first physical resource block of the first group has a total capacity that is greater than the first constant allowed capacity; and
the PHY is to discard extra bits in the first physical resource block, the extra bits being included in the first physical resource block to comply with the first constant allowed capacity.

* * * * *